US012547380B1

(12) United States Patent
Bonadiman et al.

(10) Patent No.: US 12,547,380 B1
(45) Date of Patent: Feb. 10, 2026

(54) APPLICATION CREATION ENVIRONMENT USING MULTI- MODALITY INTERFACE OPTIONS

(71) Applicant: Amazon Technologies, Inc., Reno, NV (US)

(72) Inventors: Daniele Bonadiman, Sunnyvale, CA (US); Sailik Sengupta, Santa Clara, CA (US); James Gung, New York, NY (US); Arshit Gupta, Sunnyvale, CA (US); John Baker, Bellevue, WA (US); Yi-An Lai, Bellevue, WA (US); Sebastien Jean, Brooklyn, NY (US); Saab Mansour, San Jose, CA (US); Santosh Kumar Ameti, Bellevue, WA (US); Ruhaab Markas, The Colony, TX (US); Ganesh Kumar Gella, Redmond, WA (US); Katrin Kirchhoff, Seattle, WA (US)

(73) Assignee: Amazon Technologies, Inc., Reno, NV (US)

(*) Notice: Subject to any disclaimer, the term of this patent is extended or adjusted under 35 U.S.C. 154(b) by 248 days.

(21) Appl. No.: 18/477,994

(22) Filed: Sep. 29, 2023

(51) Int. Cl.
G06F 8/33 (2018.01)
G06F 8/34 (2018.01)
G06F 11/3698 (2025.01)

(52) U.S. Cl.
CPC ............ *G06F 8/33* (2013.01); *G06F 8/34* (2013.01); *G06F 11/3698* (2025.01)

(58) Field of Classification Search
CPC ........... G06F 8/33; G06F 8/34; G06F 11/3698
USPC .................................................. 717/104–113
See application file for complete search history.

(56) References Cited

U.S. PATENT DOCUMENTS

| | | | | |
|---|---|---|---|---|
| 7,729,916 B2* | 6/2010 | Coffman | ............. | H04M 3/4936 704/270.1 |
| 7,900,186 B2* | 3/2011 | Lucassen | .................. | G06F 8/38 717/104 |
| 7,917,888 B2* | 3/2011 | Chong | ...................... | G06F 8/20 717/102 |
| 10,585,640 B2* | 3/2020 | Dolph | ........................ | G06F 8/74 |
| 11,620,993 B2* | 4/2023 | Vempaty | ................. | G10L 15/10 704/251 |
| 11,972,095 B2* | 4/2024 | Klein | ....................... | G06F 3/167 |

(Continued)

OTHER PUBLICATIONS

Latoschik, "A User Interface Framework for Multimodal VR Interactions", 2005, ACM, pp. 76-83. (Year: 2005).*

(Continued)

*Primary Examiner* — Ted T. Vo
(74) *Attorney, Agent, or Firm* — Hogan Lovells US LLP

(57) ABSTRACT

Systems and methods provide for a multi-modal development environment to receive inputs using a variety of different input modalities in different user interfaces (UIs). Multiple user interfaces may be linked within the development environment to maintain state information so that inputs provided to one UI are represented in the other UIs using an appropriate equivalent representation based on the UI modality. Users of the development environment may select a given UI for interaction based on a desired task and then see changes tracked and relayed through the different UIs to verify changes within the development environment. The UIs may also be contextually linked to permit the user to work between both UIs without losing the context due to the switch.

20 Claims, 13 Drawing Sheets

(56) References Cited

U.S. PATENT DOCUMENTS

| | | | |
|---|---|---|---|
| 12,417,110 B2* | 9/2025 | Nachreiner | G06F 9/45558 |
| 2004/0117804 A1* | 6/2004 | Scahill | G06F 9/542 |
| | | | 719/320 |
| 2024/0053996 A1* | 2/2024 | Nachreiner | G06F 9/45533 |

OTHER PUBLICATIONS

Lee et al., "Design of Multimodal Interface Framework", 2007, ICACT2007, pp. 345-348. (Year: 2007).*
Yang et al., "ReactGenie: An Object-Oriented State Abstraction for Complex Multimodal Interactions Using Large Language Models", 2023, arXiv, 15 pages. (Year: 2023).*

* cited by examiner

APPLICATION CREATION ENVIRONMENT USING MULTI- MODALITY INTERFACE OPTIONS

BACKGROUND

Developers often create customizable interaction environments for users to accomplish specific tasks or help guide certain actions. For example, a developer may offer up a chat bot or other interactive service when a user visits their website or application, which may receive inputs or prompts from the user and then provide suggestions or replies to receive additional information from the users. Interaction environments may need to be highly customizable to specifically support operations associated with the developer, which may lead to systems that are difficult to create and maintain without extensive knowledge, cost, and time. Additionally, ongoing maintenance and support of the services may further increase costs.

BRIEF DESCRIPTION OF THE DRAWINGS

Various embodiments in accordance with the present disclosure will be described with reference to the drawings, in which.

DETAILED DESCRIPTION

Figure 1:
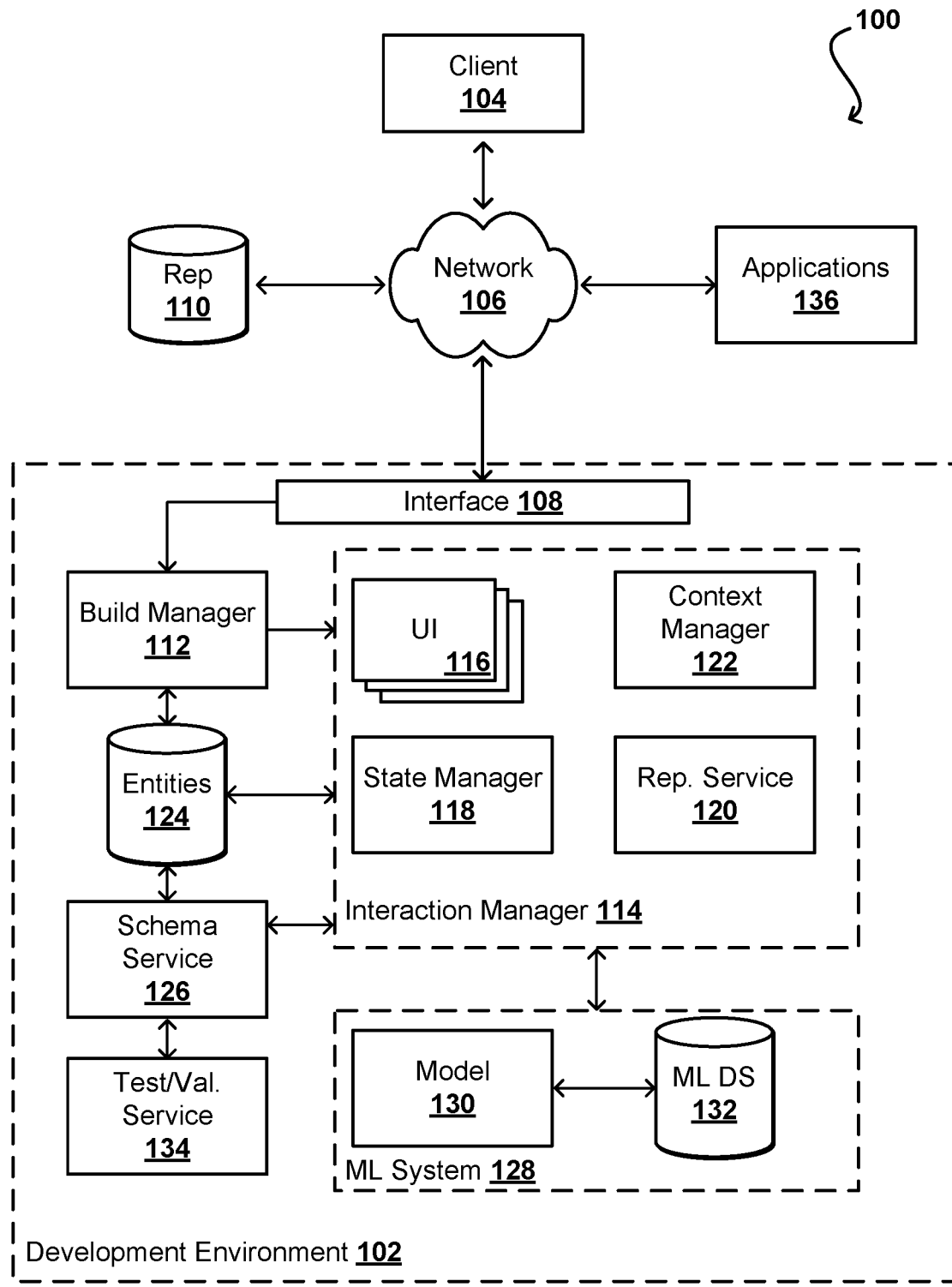
FIG. 1 illustrates an example system for providing a development environment in accordance with various embodiments.

Embodiments of the present disclosure are directed toward development environments for generating, maintaining, and testing interaction environments using a multi-modal interaction system. Various embodiments may include a development environment to permit a developer (e.g., a client, a user, etc.) to generate a customizable interaction environment, such as a chat bot or other artificial intelligence (AI) service, that provides a number of different interfaces to enable the developer to input information in a variety of different ways. These different interfaces may be updated to represent a common state, where different interfaces are updated responsive to an input or interaction with another, thereby providing developers multiple potential options to build out, modify, and/or test their interaction environments. In at least one embodiment, the interfaces may be configured or particularized to receive input from different modalities, such as a first interface serving as a graphical user interface (GUI) where the developer can click/drag icons, a second interface serving as a conversational user interface (CUI), where the developer can interact with plain language to accomplish a task, a third interface serving as a media user interface (MUI) where the developer can upload media content (e.g., images, video, transcripts, audio, etc.), and/or the like. Furthermore, in at least one embodiment, different interfaces may be combined to accomplish multiple tasks, such as the CUI and MUI functioning as a common interface. As a result, systems and methods may provide a multi-modal development environment to enable one or more developers to generate different interaction environments using different input commands.

Various embodiments address problems associated with designing and maintaining interaction environments, including as a non-limiting example enterprise chat bots. These processes are often time-consuming, labor-intensive, and expensive, typically requiring skills related to software engineering, machine learning, and user experience design. Moreover, onboarding to a new chat bot platform is also difficult, as each platform may have its own concepts and best practices. Systems and methods address and overcome these problems, among others, by providing a multi-modal development environment that enables developers to design, build, and test their interaction environments through a fully-integrated multimodal interface with a number of different interface options, such as a GUI and a CUI. In at least one embodiment, CUI-based design allows developers who are new to the platform to specify what they want in natural language, with changes reflected through the GUI by maintain a state of the environment between each interface. GUI interactions may be recorded as part of the conversation in the CUI, so that developers can reference actions they performed earlier, such as the current bot element they are editing, in the conversation. For example, if the developer were to add a new element in the GUI, the CUI may record such an action such as provide a textual description for an "element added to the flow." Similarly, if the developer instructed the CUI to "add this flow before all before other actions that use the same API" the movement and/or logical position of the flow would appear in the GUI. As another example, if the developer instructed, via the CUI, for the environment to "show me all flows related to that," the context-based approach of the CUI may evaluate and determine what "that" is referencing by evaluating the context of previous interactions within the GUI or CUI. Accordingly, providing a number of different interaction spaces allows for complex multi-step instructions to be carried out that would take many clicks/actions if only a GUI and/or only a CUI were provided. Various embodiments may also integrate a suggestion service that, through the CUI and/or GUI, may make proactive design suggestions based on platform best practices or clarify ambiguous instructions. The tight integration of GUI and CUI (or various other potential user interfaces) ensures that the developer can learn the features of the platform through conversation and provides a simplified approach to generating custom interaction environments.

Various embodiments of the present disclosure provide for a development environment in which a developer can leverage existing application program interfaces (APIs) and a multi-modal input and interface structure to develop customizable interaction environments. In at least one embodiment, the development environment includes a bootstrapping mechanism that enables a developer to provide and implement their own structured representations (e.g., APIs) for a given interaction environment. Furthermore, the bootstrapping mechanism may also enable natural language description inputs, and/or media inputs in order to identify and extract information to establish one or more workflows for the interaction environment. Furthermore, a builder assistant may be incorporated to record and maintains states between different UIs associated with the development environment. The coordination between different UIs may enable a developer to perform atomic operations (e.g., adding an entity, deleting an entity, etc.) using one interface, such as a GUI, and then handle modifications or changes (e.g., set up validation logic, add documentation or code, merge intents, etc.) to the entity using another interface, such as a CUI. The changes in one UI may be reflected in another, for example using an appropriate representation for a given UI. Various embodiments may also provide a testing and validation environment for improvement through interaction by providing a low-latency environment for testing, providing proactive recommendations, and the like for improved building and workflow evaluation prior to full deployment.

FIG. 1 illustrates an example environment 100 for creating, testing, and deploying one or more interaction environments, in accordance with various embodiments of the present disclosure. In this example, a development environment 102 is used to provide access to one or more resources that a client 104 (e.g., a client device, a user, a developer, etc.) may access via one or more networks 106 to create customizable interaction environments, such as deployable and/or accessible include environments including chat bots, AI systems, and the like, for deployment in one or more remote or networked systems. The development environment 102 may execute on one or more underlying resources, such as compute resources, storage resources, and/or the like, when queried by the client 104. It should be appreciated that various other components may also be included, or hosted separately in a different environment, and are not shown for clarity with the following discussion. Furthermore, these components are shown by way of example and are not intended to limit the scope of the present disclosure. The resources can include physical and virtual resources that may be located at one or more locations controlled by the provider or a third-party, or may be located at a location controlled by the client, or an entity with which the client is associated. Moreover, various resources may be illustrated as separate blocks or components, but different embodiments may group or otherwise share functionality between different blocks or components In this example, the client 104 may request access to the development environment 102 in order to create one or more interaction environments, for example with a design experience or tool provided for creation of various environments. For example, the development environment 102 may host a builder or may provide access as part of a service for hosting or otherwise providing a service to one or more products from the client 104, such as a website or an application. In at least one embodiment, the client 104 may use one or more client devices to access the resources of the development environment 102 over the one or more networks 106. The client 104 and/or the client device may be referred to interchangeably in that the client device facilities the interaction with the development environment 102. Moreover, the client device may execute one or more actions or tasks according to one or more rules or instructions stored on different memories such that physical interaction or explicit instructions from the client 104 are not used.

The client device can include any appropriate electronic device operable to send and receive requests, messages, or other such information over an appropriate network and convey information back to a user of the device and/or convey information that can be confirmed or otherwise analyzed by software executing on the device. Examples of such client devices include personal computers, tablet computers, smart phones, notebook computers, various edge devices, and the like. The network(s) 106 can include any appropriate network, including an intranet, the Internet, a cellular network, a local area network (LAN), or any other such network or combination, and communication over the network can be enabled via wired and/or wireless connections. The development environment 102 can include any appropriate components for receiving requests and returning information or performing actions in response to those requests. As an example, the provider environment might include Web servers and/or application servers for receiving and processing requests, then returning data, access to resources, Web pages, video, audio, or other such content or information in response to the request.

The development environment 102 may be a cloud provider network. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to client commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The cloud provider network may implement various computing resources or services, which may include a virtual compute service (referred to in various implementations as an elastic compute service, a virtual machines service, a computing cloud service, a compute engine, or a cloud compute service), data processing service(s) (e.g., map reduce, data flow, and/or other large scale data processing techniques), data storage services (e.g., object storage services, block-based storage services (referred to in various implementations as cloud disks service, a managed disk service, a storage area network service, a persistent disk service, or a block volumes service), or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

In various embodiments, the development environment 102 may include various types of electronic resources that can be utilized by multiple users for a variety of different purposes. In at least some embodiments, all or a portion of a given resource or set of resources might be allocated to a particular user or allocated for a particular task, for at least a determined period of time. This can include, for example, enabling a customer to launch one or more instances of one or more types of these resources. In at least one embodiment, a resource instance can include storage volumes, compute instances, and network interfaces, among other such options. This can include, for example, enabling a customer to launch one or more instances of one or more types of these resources. The sharing of these multi-tenant resources from a provider environment is often referred to as resource sharing, Web services, or "cloud computing," among other such terms and depending upon the specific environment and/or implementation.

In one embodiment, the development environment 102 can correspond to a service provider that, in addition to providing access to the resources, may also provide additional monitoring and management services, which can use resource capacity from one or more storage solutions, among other options, to provision resources and/or execute various tasks associated with a user account. In this example, a request to the development environment 102 can be received by an interface layer 108 of the environment. As known for network environments, the interface layer can include components such as interfaces (e.g., APIs), load balancers, request and/or data routers, and the like.

In various embodiments, the request may include a command or an input, which may be accompanied by additional data, such as a file uploaded that may correspond to one or more structured representations or templates associated with different APIs that the client 104 may want to incorporate into an interaction environment. Additionally, in certain embodiments, the client 104 may provide a link to a representation datastore 110. Different representations may then be retrieved from the representation datastore 110, which may be accessible over the network 106, for example responsive to received instructions from the client 104. Further, in various embodiments, the representation datastore 110 or portions thereof may also be stored within the development environment 102, for example as part of a set of storage resources that are associated with one or more authorized users of the development environment 102.

During operation, the client 104 may submit multiple different requests to the development environment 102. For example, the client 104 may submit a request to load a builder to develop an interaction environment, to access the development environment 102, and/or to make changes or perform actions within the builder environment. A build manager 112 may receive the various inputs from the client 104, which may be routed through the interface layer 108, which may further correspond to different interfaces depending on the status of the client 104 (e.g., logged in, using a builder, etc.) The build manager 112 may route the requests to the appropriate system or sub-system. Additionally, the build manager 112 may process requests and then implement one or more workflows responsive to the requests, such as to load an interaction environment and/or to retrieve a file, among various other options. In at least one embodiment, the development environment 102 may enable the client 104 to build and test their own interaction environments, which may be associated with an interaction manager 114. In this example, the interaction manager 114 may provide one or more UIs 116 that can serve as endpoints for interactions with the client 104. For example, the different UIs 116 may be presented to the client 104 to receive instructions for performing actions when building out their interaction environment, such as a chat bot.

In at least one embodiment, the UIs 116 may correspond to UIs that have different input modalities. By way of example, one UI may be a GUI that graphically visualizes different components of the desired interaction environment, such as showing a layout of different interactable elements, illustrating how components are connected or logically execute through one or more flows, and/or the like. As another example UI, a CUI may provide an interaction environment where the client can submit natural language instructions, such as textual instructions or audio instructions, that may be parsed and processed using the interaction manager 114. For example, the CUI may receive a natural language input and then determine, from the natural language input, one or more actions to perform. Furthermore, for an audio input, the CUI may transmit the audio for processing, such as by using one or more machine learning systems, and then determine an appropriate action based on the audio input. Various embodiments of the present disclosure may combine or group different UIs together. For example, the GUI may execute as a stand-alone UI while the CUI may incorporate features to permit the client 104 to input text, audio, video, images, and/or combinations thereof. In this manner, the client 104 may have options regarding how they build out or modify a given interaction environment. Additionally, in various embodiments, one or more UIs 116 may be operable with multiple different input modalities. For example, the CUI may receive a textual input, an auditory input, or a media input (e.g., images, videos, etc.) while the GUI may receive an input provided via a device, such as a mouse used to click on an icon or a touch screen to select an icon, among various other options. Accordingly, systems and methods may integrate different input modalities into different UIs. Furthermore, different input modalities may be selected within different UIs based on user inputs. For example, the CUI may include different icons or menu items to select textual inputs, image inputs, file updates, audio inputs, and/or the like.

The interaction manager 114 may include a state manager 118 to monitor and maintain a common state or status between the different UIs 116. That is, the state manager may receive an input to perform an action within one UI 116 and may provide a representation of that action in each of the UIs 116 being used with the interaction manager 114. For example, if a first UI corresponds to a GUI and the client 104 submits a command to add an entity or action, a representation service 120 may be used to determine an appropriate representation of the action within the GUI and then to generate and implement that representation within the UI 116 corresponding to the GUI. Similarly, because such an action appeared within the GUI, the representation service 120 may be used to determine an appropriate equivalent representation of the action for the various other UIs, such as the CUI, and then generate and update the CUI to also represent the current state based on the input to the GUI. By way of example, the GUI may include a graphical representation of an action while the CUI may be used to present a textual message or log information associated with the action. In other words, the GUI may be updated with an icon associated with the action and the CUI may be updated with a textual or auditory description, such as "entity X has been added."

In at least one embodiment, the representation service 120 may determine what types of representation information to provide within a given UI 116. For example, an organization may have specific graphical preferences and the representation service 120 may have access to the preferences, which may be a set of rules or parameters, and then use those preferences to visually represent a given action within the GUI. As another example, a client may submit a natural language command into the CUI, such as "delete entity Y" and, responsive to the request, the GUI may be updated to remove entity Y. As a result, state information is maintained between the different UIs, which allows the client 104 to transition back and forth between using the different UIs 116, thereby simplifying the interaction process because the client 104 can select the easiest or most efficient method to build out their interaction environments. By way of example, it may be easier for the client 104 to request batch updates through the CUI, such as "update all blocks to include an end date" rather than individually going through each entity within the CUI or GUI to make an update. Similarly, it may be faster to click and drag entities from a template, as opposed to writing out individual entities for inclusion within the interaction environment.

Various embodiments further include a context manager 122, which may be used to track and/or monitor various interactions within the interaction manager 114. For example, the context manager 122 may be used to track and/or support a running log or dialogue within the UI 116 (such as the CUI) to support additional interactions with the client 104. The client 104 may use the GUI to add an additional entity and then submit, as an instruction in textural or audio form, to the CUI additional parameters or settings for that entity. After adding in the new entity, the client 104 may then instruct the CUI to "add parameters for high and low price to that" where the context manager 122 would recognize "that" refers to the recently added entity. In this manner, designing and updating the interaction environment may be more fluid because the client 104 can communicate in plain language based on their current actions with the context being tracked by the interaction manager 114. For example, if the client instructed some action "to that" and context was not tracked, then the interaction manager 114 would need to reply to that command with additional requests to the client 104 for more information, which may reduce a likelihood of use or cause friction in trying to modify or update designs. Embodiments of the present disclosure overcome this problem by tracking and maintaining context through use of the interaction manager 114 in order to enable natural interactions when generating different interaction environments.

Systems and methods may permit the use of a variety of different modalities and these modalities may be logically grouped within common UIs 116. For example, the CUI may include both an option to input text and audio because it may logically flow that the client may want to both type and then provide verbal commands. Additionally, in certain embodiments, uploading files or information may also be integrated into one or more of the GUI and/or CUI, or other UIs 116 provided for use with the interaction manager 114. In an example where the client 104 uploads an image, one or more machine learning systems may be used to identify features in the image, such as words or phrases, and then extract meaning and/or actions from the features. For example, a client may upload a drawing or sketch of a workflow that may be analyzed and then parsed to identify different actions and their connections for generation by the interaction manager 114.

As noted herein, various embodiments of the present disclosure may be implemented when creating or tuning interaction environments, which may include various actions or options for users, that may be stored or pre-loaded within an entity datastore 124. The entity datastore 124 may include different representations, documents, APIs, schemas, and/or the like associated with operations that may be implemented within various interaction environments. For example, the development environment 102 may include pre-loaded APIs or schemas to perform a variety of tasks for different types of interaction environments, such as text recognition schemas for chat bots or search tools. Additionally, the client 104 may bring their own custom entities, such as those stored in the representation datastore 110. The entities within the entity datastore 124 may be implemented into the interaction environment when selected by the client 104 for use with the interaction manager 114 and/or may be loaded responsive to a request for guidance or help. For example, the client 104 may instruct the interaction manager 114 to "help me build a flight search tool" and the build manager 112 and/or the interaction manager 114 may pull one or more different tools from the entity datastore 124 to populate a GUI. The entities pulled may be common entities used for flight search tools, such as dates, airline names, origins, destinations, and/or the like. Each entity may further be associated with a particular schema or configuration that includes one or more variables to populate to implement actions with the associated entities.

In at least one embodiment, a schema service 126 may be used to provide the schemas for the associated entities to the interaction manager 114 and/or to identify different variables or values required for selected entities and then suggest or otherwise link other entities or tools needed to fulfill the various values. For example, if the client 104 wanted to implement an entity that had a dependency on another entity, the schema service 126 could recognize the connection between the two and then implement an additional entity within the interaction manager 114 to enable population of the variables.

Various embodiments of the present disclosure may also use one or more machine learning (ML) systems 128 that execute different machine learning models 130 acquired from a model datastore 132. For example, different machine learning models 130 may be used in combination with the interaction manager 114 to identify and extract information provided by the client 104. A language model, for example, may be used to identify input text or audio from the client 104, recognize salient information, and/or to provide updates or information back to the client 104. In another example, an image identification model may be used to extract features from one or more input images, such as the client 104 providing a sketch of their desired workflow and then extracting and identifying different tools associated with the workflow. Furthermore, one or more models 130 may be used to evaluate input information, such as chat logs, to identify an associated workflow, for example, by identifying patterns within the chat log to recognize information typically requested during a conversation to resolve one or more issues. In this manner, the machine learning system 128 may be used to provide additional services to users of the interaction manager 114 while also providing a more fluid, natural discussion and flow between the development environment 102 and the client 104.

Systems and methods may also enable testing and validation of an interaction environment using one or more testing and validation services 134. The testing and validation services 134 may be implemented such that no connections are formed between the various APIs/entities/tools associated with the interaction environment to reduce bandwidth and/or latency to build and test the interaction environment. For example, the client 104 may submit a request and/or a reply to a query from the interaction environment and receive a test response, which may then allow the client 104 to determine whether adjustments are necessary to the workflow of the interaction environment. Additionally, in at least one embodiment, recommendations may be provided within the testing and validation service 134 for changes or modifications to improve the service. Accordingly, various embodiments may be used to generate interaction environments that leverage a multi-modal interface, context tracing, state information, and various machine learning models to provide a variety of different interface, evaluation, and suggestion options. These interaction environments may then be exported or otherwise implemented into applications 136 associated with the client 104, which as noted herein may also be hosted by a provider associated with the development environment 102.

Various embodiments are directed toward a builder experience that requires lower effort and less client expertise while still providing high-customizability for various interaction environments. The builder experience may leverage a robust bootstrapping mechanism where a developer (e.g., client) may provide a variety of different inputs to build an interaction environment, such as a structured representation (e.g., OpenAPIs), a natural language description (e.g., "I want to build an airline bot that can find and book flights, check status of flights, and cancel bookings"), and/or samples of interactions to extract and or devise workflows (e.g., transcripts from call center interactions). A builder assistant may be implemented that includes multi-modal inputs to permit interaction with a variety of different UIs at a time (e.g., a GUI and/or a CUI). By providing multiple instances of connected, structured interaction options, the developer may perform atomic operations (e.g., delete an action, add an entity, etc.) using one UI (e.g., a GUI) and then handle complicated modifications (e.g., set up a validation logic, add a document/code hook, merge intents) using another UI (e.g., a CUI). Systems and methods also enable building and testing in a side-by-side environment that may further include proactive recommendations to add actions, entities, validation logic, and API support to improve the conversational workflow.

Systems and methods may be used to implement a builder assistant that includes multi-modal bot building that may take inputs as commands from a client (e.g., a click and drag approach in a GUI), a textual input, an auditory input, a video input, an image input, and/or various combinations thereof. The various UIs provided with the builder assistant may be linked or otherwise maintained to update different states between the UIs to provide the client with an updated state of their application regardless of the input used. In this manner, the client may choose the preferred input method. For example, atomic actions may be easier through a GUI while complex semantically rich actions may be better achieved through language. Additionally, the builder assistant may be context aware, such as by implementing one or more machine learning models, to maintain states between the various different UIs being implemented and also to identify and recognize different sections or entities receiving interactions. This context aware approach may provide a more natural and integrated conversation between the client and the builder assistant. By maintaining an awareness of the history of interactions between different entities, an interaction efficiency may be improved and provide an improved user experience. Furthermore, various embodiments may provide proactive recommendations to the client based on the conversation. For example, if the client wanted to build an airline bot, but did not have an option to sort search options by price, various embodiments may recommend including this action based on the domain (e.g., airline flights) and historical information of commonly used entities for that domain. As noted herein, systems and methods may further implement various machine learning systems, including one or more large language models to abstract away rich functionalities as API abstractions.

FIGS. 2A-2H illustrate example interfaces associated with a builder tool that may be used with embodiments of the present disclosure. FIGS. 2A-2H illustrate an example flow for building an interaction environment within a developer environment using a builder tool 200 that includes a pair of UIs 202, 204. As noted herein, while various embodiments may illustrate two UIs 202, 204, different systems and methods may use additional UIs. Furthermore, the UIs 202, 204 may also have additional functionality and/or use with other modalities in other embodiments. In this example, a first UI 202 may be a GUI and a second UI 204 may be a CUI. Each of the UIs 202, 204 provides interaction elements 206 that the client can select in order to provide input information. For example, the interaction elements 206A, 206B in the first UI 202 correspond to clickable icons that the client may select and then choose different plugins, actions, entities, and/or the like. It should be appreciated that the layout and interaction elements 206A, 206B within the first UI 202 is shown by way of non-limiting example and that different configurations may be included, such as a list that a user can click and drag from, additional elements, and/or the like. Similarly, the second UI 204 includes the interaction element 206C to submit textual inputs, but various embodiments may also allow the user to enter audio, video, images, and/or the like. While the illustrated embodiment includes the interaction elements 206A, 206B, 206C, it should be appreciated that there may be more or fewer interaction elements and that the interaction elements may be provided in a variety of different ways. For example, interaction elements may be presented as selectable components of a drop-down menu. Additionally, interaction elements may be provided and/or presented by the interaction environment responsive to an input from a user.

In this example, the builder tool may provide a query 208A (which may be referred to collectively as 208) to the user when the user begins using the tool and wait for a response 210A (which may be referred to collectively as 210) from the user. In this example, the query 208A asks the user to start using the tool and the response 210A includes the user asking for guidance and/or help with generating a specific tool within a given domain. For example, in various embodiments, the builder environment may have a set of common tasks or domains that include pre-built APIs, entities, plugins, and/or the like. One or more ML systems may be used to evaluate the response 210A and then determine a domain associated with the response, such as by extracting keywords or phrases from the response 210A and comparing those keywords or phrases to a set of domains within a datastore, among other options.

Figure 2A:
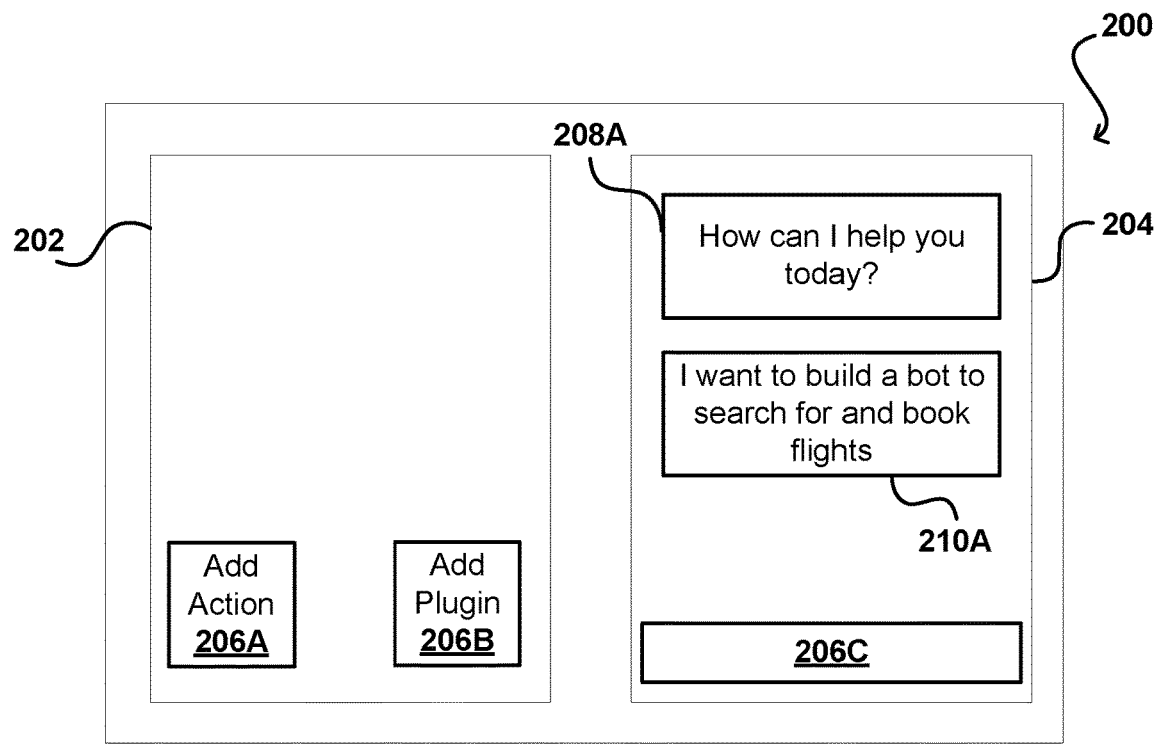
FIGS. 2A-2H illustrate example representations of builder tools for a development environment in accordance with various embodiments.
Figure 2B:
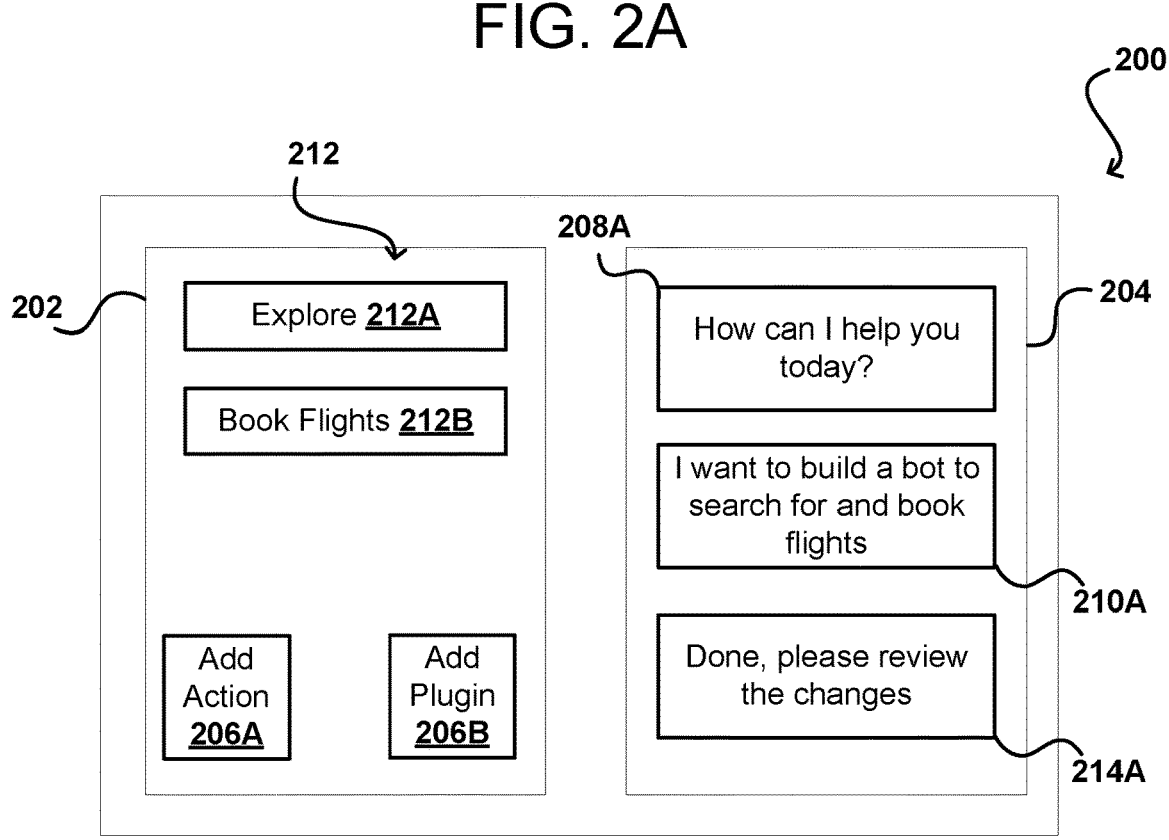

FIG. 2B illustrates the builder tool 200 in which both the first UI 202 and the second UI 204 have been updated responsive to the response 208A submitted by the client. In this example, the response 210A has been parsed to identify one or more features that were used to recognize a domain and to select one or more actions 212 that are now shown in the first UI 202. For example, a first action 212A is a tool to allow a user to explore possible destinations and a second action 212B is a tool that allows a user to book flights. Additionally, the second UI 204 has been populated with a confirmation 214A (which may be referred to collectively as 214) to tell or otherwise relay information (e.g., provide a representation) within the second UI 204 regarding the action that is shown in the first UI 202. In other words, the response 210A prompted an action by the builder tool 200 that was reflected within the first UI 202, and in response to that change in state, the second UI 204 is also updated. Furthermore, while the interaction element 206C has been omitted from the embodiment of FIGS. 2B-2H, this omission is provided only for clarity and conciseness and one or more interaction elements may persist or otherwise be maintained with the different UIs 202, 204. For example, the interaction element 206C may be a collapsible icon that collapses within the screen and then is expanded when a user hovers over it. Additionally, the interaction element 206C may be part of a drop menu. Furthermore, the interaction element 206C may be in a static position on the screen, or various combinations of positioning and presentation may be incorporated and selected based on preferences of the user.

Figure 2C:
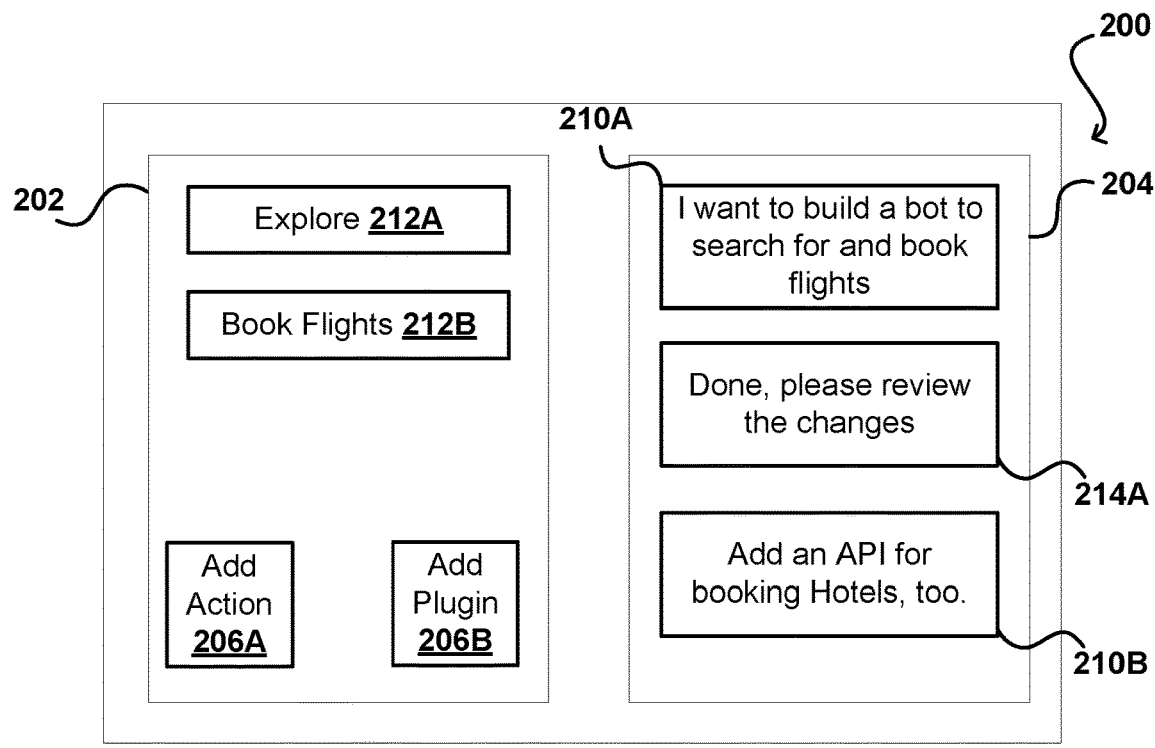
Figure 2D:
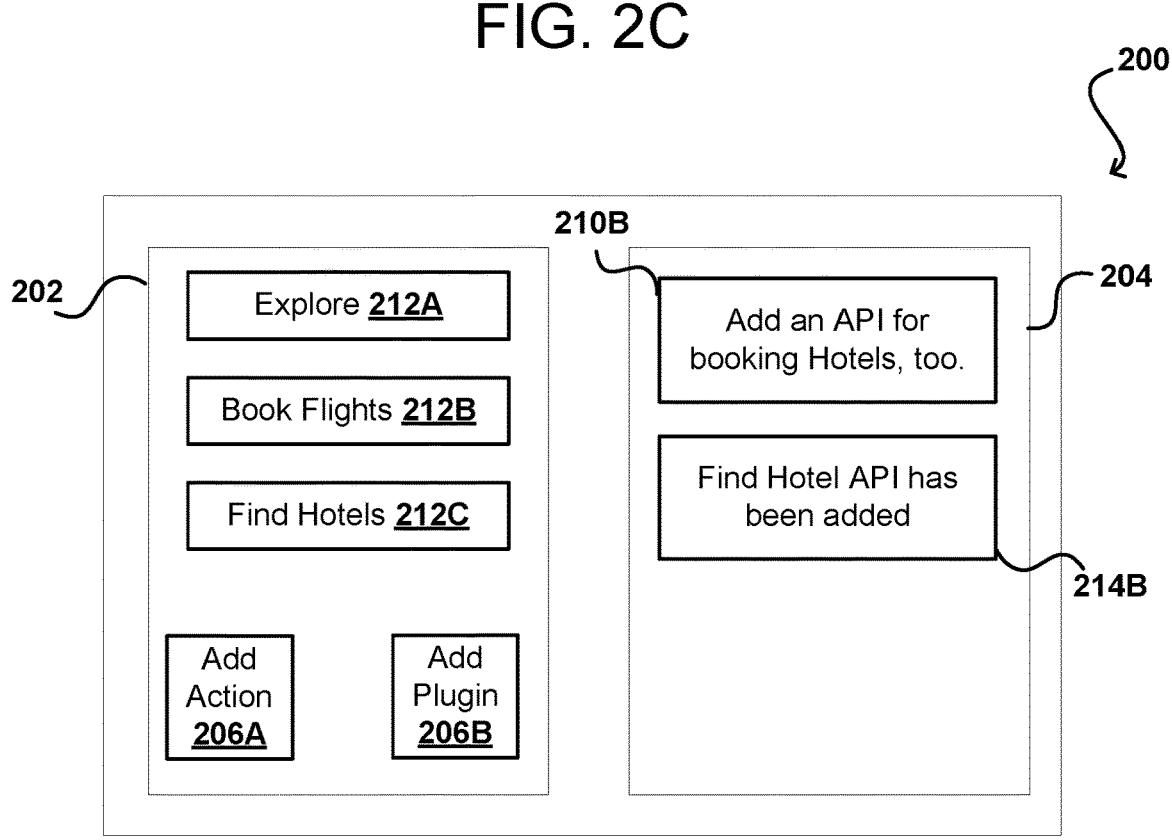

FIG. 2C illustrates continued interaction with the builder tool 200 where the client has included a second request 210B to include an additional action for their interaction environment. The builder tool 200 may parse the second request 210B to identify one or more additional APIs or actions to satisfy the request and then provide the requested API into the first UI 202, as shown in FIG. 2D, while also updating the second UI 204 with a second confirmation 214B. Accordingly, state information is tracked between the different UIs 202, 204 and updated to reflect changes, whether they are implemented via the first UI 202 or the second UI 204.

Figure 2E:
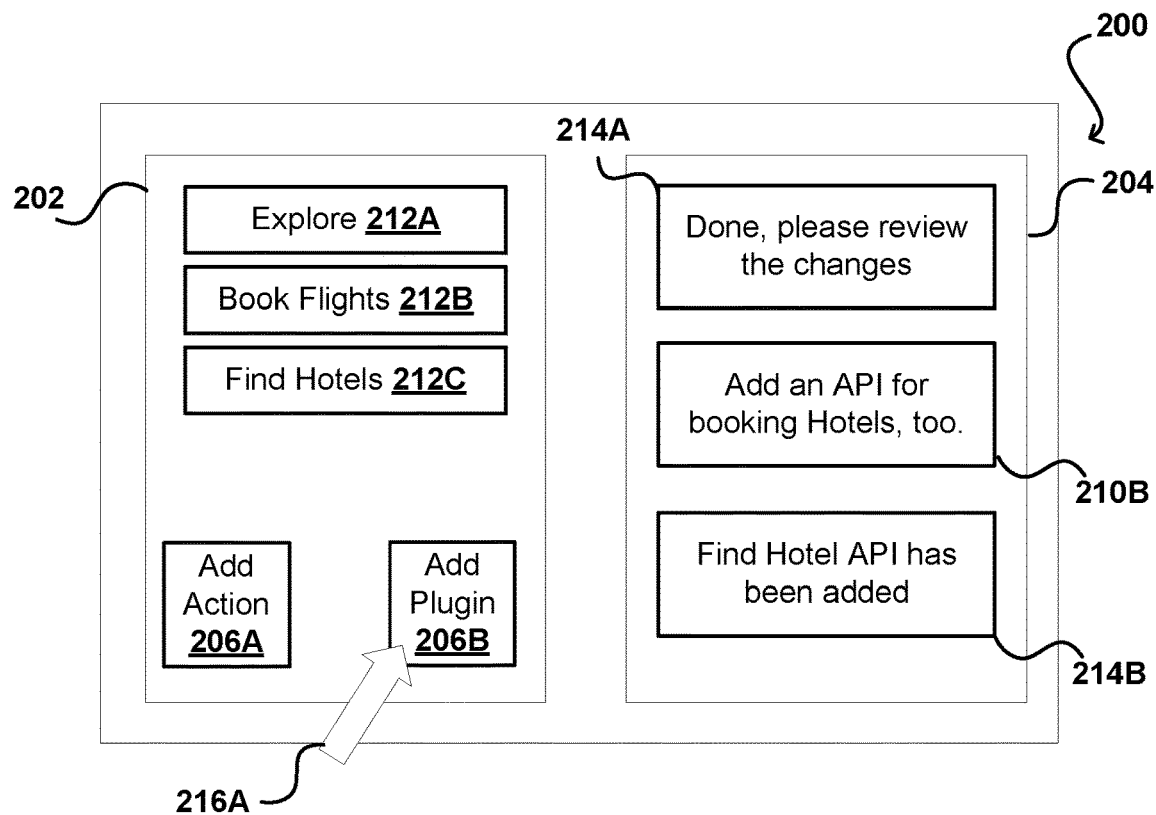

FIG. 2E illustrates continued interaction with the builder tool 200 where the client has provided an interaction 216A (e.g., an input) to add a new plugin. The interaction 216A is associated with the first UI 202 and requests the addition of a new plugin via the interaction element 206B. In at least one embodiment, a list of plugins may then be provided for selection by the user. The list of plugins may be pulled from an entity database, for example, and may be associated with one or more domains for the particular interaction environment. For example, the current interaction environment is directed toward booking a flight, and therefore, it would not make sense to include plugins for scheduling a doctor appointment or plugins to provide sporting news. However, plugins associated with travel may be included in the list, such as plugins associated with weather at the desired destination, flight trackers, surf or hiking reports, and/or the like.

Figure 2F:
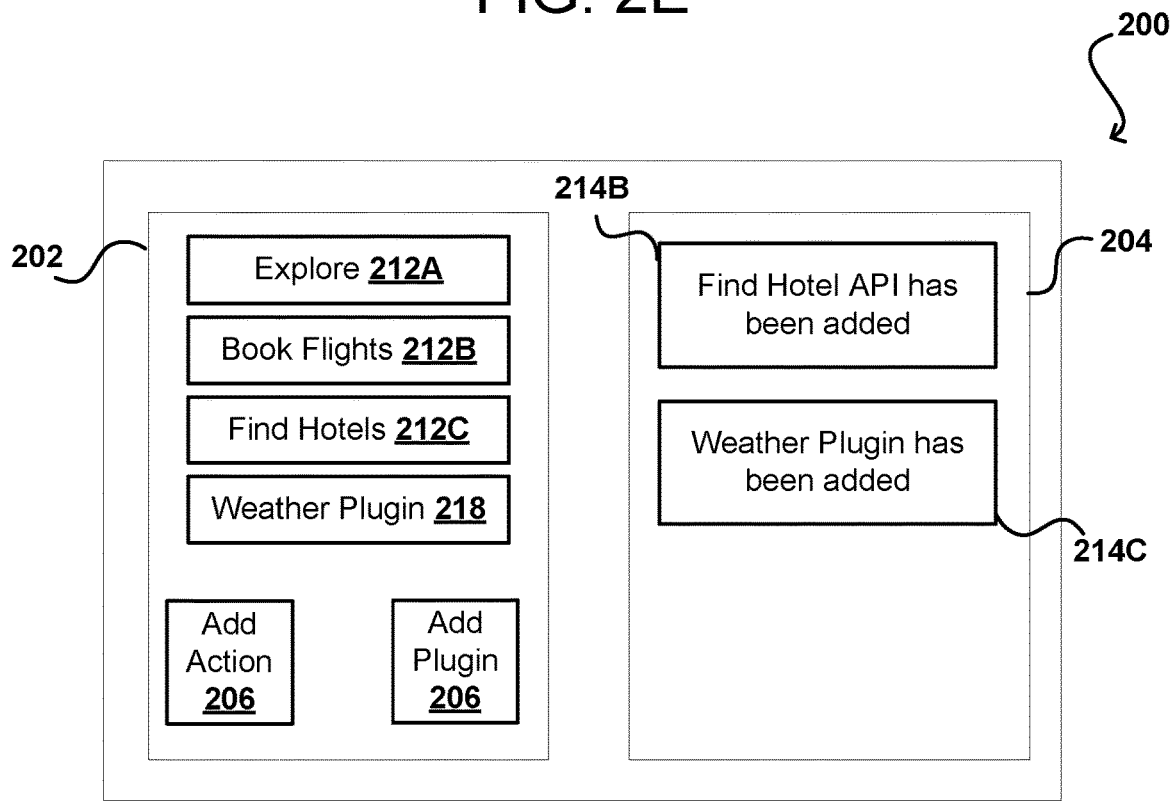

FIG. 2F illustrates the updated first UI 202 that now includes the a plugin 218 associated with the weather. Furthermore, a confirmation 214C is now shown in the second UI 204 to provide information regarding the addition of the plugin 218 to the first UI 202. For example, the state of the first UI 202 is changed due to the addition of the plugin 218 and that state change has been represented textually in the second UI 204.

Figure 2G:
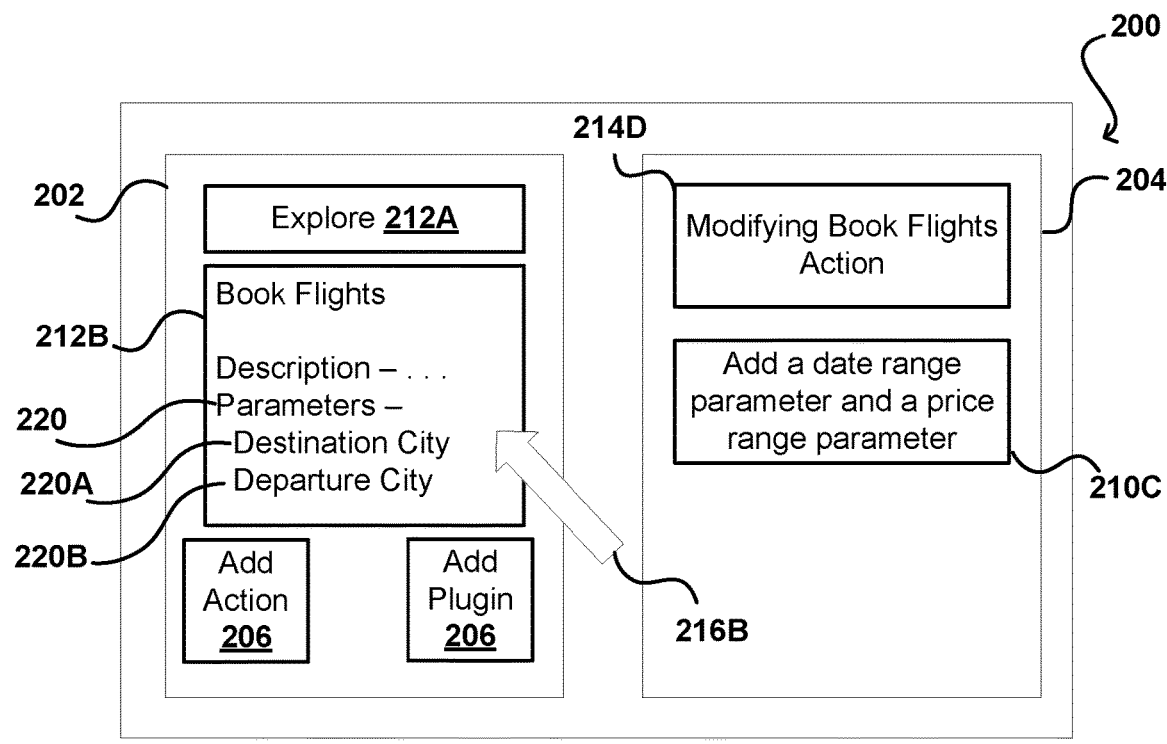

Various embodiments of the present disclosure may also be used to modify or otherwise adjust different parameters of the various actions 212 and/or plugins 218 added to the interaction environment. As discussed herein, it may be desirable to use one or the other UI to implement these atomic actions based on simplicity for the user. For example, executing a global change such as "change all units to kilometers" may be easier using the second UI 204 than to individually change the settings within each action 212 and/or plugin 218. FIG. 2G illustrates a second interaction 216B in which the client has selected a particular action, in this case the Book Flights action 212B, and is now modifying or adjusting different parameters using the first UI 202. In this example, different parameters 220 have been added by the client. Specifically, a first parameter 220A corresponds to a Destination City and a second parameter 220B corresponds to a Departure City. The client may modify the action 212B via the first UI 202 and, because the state has been changed, the second UI 204 may reflect that change using a representation appropriate for the second UI 204, which in this case is a textual description indicating that the Book Flights action 212B has been modified, as shown in a confirmation 214D.

Figure 2H:
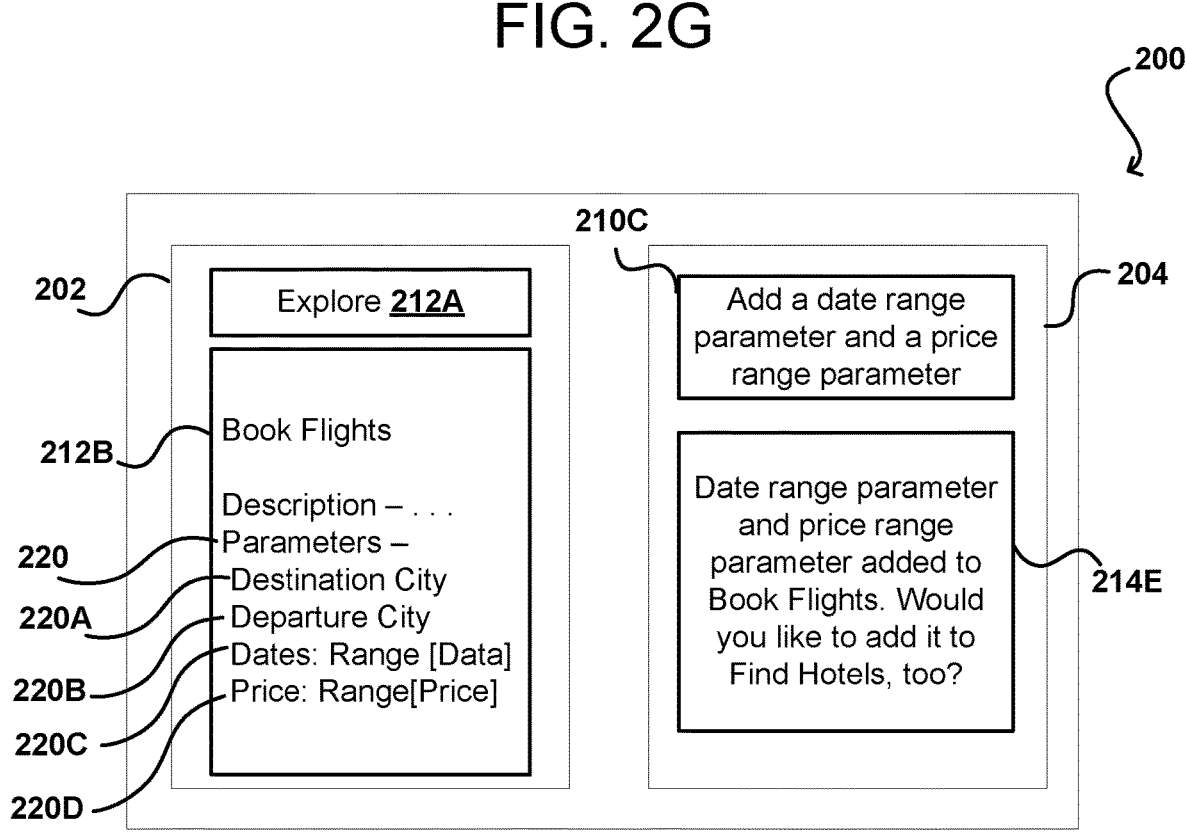

Further illustrated in FIG. 2G is another request 210C to "Add a date range parameter and a price range parameter." As noted herein, context of the user interactions may be tracked throughout the builder tool to enable a flowing conversational approach. For example, in this case, the request 210C does not specify where the indicated parameters should be added. However, due to the contextual linking provided by systems and methods of the present disclosure, the builder tool may infer that the additional parameters are associated with the Book Flights action 212B that was previously modified by the client. Accordingly, as illustrated in FIG. 2H, additional parameters 220C, 220D corresponding to the requested features (e.g., date range and price range) are now added to the Book Flights action 212B, as shown in the confirmation 214E. Additionally, contextual information may also be used to link or otherwise identify parameters that may also be associated with additional actions or plugins of the interaction environment. For example, the build tool may provide a recommendation or suggestion regarding the newly added parameters 220C, 220D, which in this case is a request to add those parameters to another action, specifically the Find Hotels action 212C (FIG. 2F). Linking these parameters may be done by inference using one or more machine learning systems because it would make sense that the date ranges for the flight would substantially corresponds to a hotel stay, too.

Accordingly, systems and methods of the present disclosure are directed toward a builder tool that provides multimodal interactions so that a client can determine the most efficient and simplified way to build out different interaction environments. Various embodiments may maintain states between different UIs associated with the builder tool to provide updates and/or confirm different actions, among other options. Furthermore, systems and methods may also be used to provide recommendations for additional updates or changes to the interaction environment based on contextual information and/or inferences based on client interactions. In this manner, the builder tool can simplify generation of different interaction environments.

Figure 3:
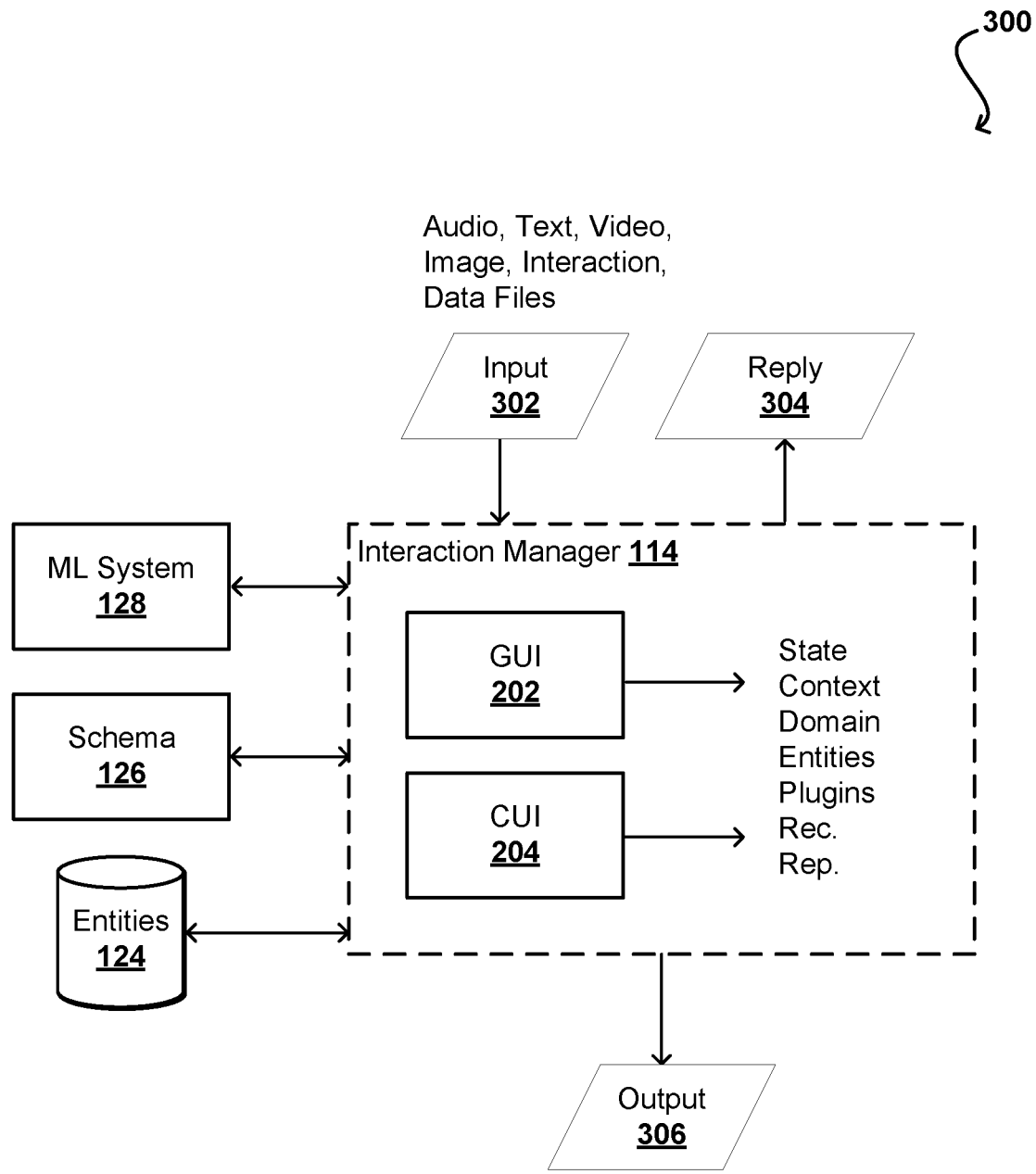
FIG. 3 illustrates an example environment for generating interaction environments using an interaction manager in accordance with various embodiments.

FIG. 3 illustrates an example environment 300 that can be used with embodiments of the present disclosure. In this example, an input 302 is provided to the interaction manager 114, which may include routing the input 302 through the builder manager, as noted herein. Various embodiments of the present disclosure may enable use of multi-modal inputs to the interaction manager 114, thereby increasing a likelihood that a client interacting with the interaction manager 114 can efficiently and easily use their input method of choice in order to generate different interaction environments. By way of non-limiting example, inputs 302 may include audio inputs, textual inputs, video inputs, image inputs, interactions through different devices, data files, and/or combinations thereof. For example, the input 302 may include a link (e.g., text) to a data file. Additionally, the input may include an image that is associated with a frame extracted from a video. Accordingly, systems and methods of the present disclosure may enable a variety of different options for interacting with and providing instructions to the interaction manager 114.

In at least one embodiment, the interaction manager 114 is used to present the UIs 202, 204, which in this example include the GUI and CUI. Based on the type of inputs 302 received, information may be directed toward a particular UI 202, 204. For example, a textual input may be routed through the CUI 204 while a click and drop feature may be associated with the GUI 202. Each of the UIs 202, 204 may be linked or otherwise tied to one another, and other UIs in embodiments with more than two, in order to track and maintain state information between the UIs 202, 204. For example, an action performed in one UI is processed and then represented on the other UI. As a result, the client may be able to seamlessly flow between using the first UI 202 and then using the second UI 204 based on their desired actions because it may be more efficient or easier to use a first type of input for a first task and then a second type of input for a second task.

Additional information may be tracked and/or extracted from the UIs 202, 204 based on the inputs 302 provided and/or additional information that may be acquired and/or inferred from actions associated with the UIs 202, 204. In at least one embodiment, the ML system 128 may be used to identify and extract keywords or phrases associated with different actions, which may enable detection of certain operations for representation in the different UIs 202, 204. For example, the client may provide a textual command to the CUI 204 (e.g., add a new plugin) and the representation of the new plugin may be shown on the GUI 202. Thereafter, if the client were to interact with the GUI 202, the representation of the new plugin would be provided, even though its inclusion was prompted through a command using the CUI 204. As a result, systems and methods enable clients to determine their preferred interaction methods and to provide input accordingly.

Additional information may also be acquired using one or more replies 304 generated by the interaction manager 114. The one or more replies 304 may be requests for additional information from the user, such as information to expand on or clarify aspects of the inputs 302. The replies 304 may also present options for providing additional inputs 302 to the user, such as a multi-modal response system in which the user may receive one or more replies 304 that include options to provide additional text, audio, images, or interactions (e.g., clicks or selections of interaction elements). In at least one embodiment, the replies 304 are provided responsive to the input 302 and are used to clarify or otherwise obtain further information. However, the replies 304 may also refer to verifications or confirmations of actions. For example, if the user were to interact with the GUI 202 to add an entity, the reply 304 may be provided using the CUI 204 to log or otherwise provide a confirmation that the action is performed.

Various embodiments of the present disclosure may also incorporate different entities from one or more entity datastores 124, such as different APIs, plugins, and/or the like. Furthermore, the schema services 126 may be used to identify associated inputs for different entities, which may be used to provide suggestions or recommendations for additional inputs or prompts with the interaction environment being developed by the client. In at least one embodiment, domain information may be extracted from the various inputs 302 in order to generate different recommendations. For example, a domain associated with booking travel may prompt suggestions to include entities or plugins associated with hotels, flights, rental cars, and/or the like. Similarly, a domain associated with customer services may prompt suggestions to include entities or plugins associated with identifying shipping information, servicing refunds, and/or the like. The domains may be determined using the machine learning system 128, for example by extracting keywords or phrases and then mapping those phrases to particular domains using historical information. Furthermore, the client may provide a particular domain or may be in a business associated with a domain, which may enable inference of the desired goals of the client.

Systems and methods may be used to generate one or more interaction environments, such as a chat bot or a virtual assistant, that may be provided to various users associated with the client. In at least one embodiment, an output 306 may include one or more deployable or executable files that may be hosted or otherwise integrated into a service offering from the client, such as a website or within a mobile application. Furthermore, prior to launch, the output 306 may be tested and validated without fully launching different APIs, thereby providing a faster, lower latency build and testing environment.

FIGS. 4A-4D illustrate an example testing environment 400 that may be used with embodiments of the present disclosure. In this example, an interaction environment 402 is deployed within the testing environment 400 alongside a review panel 404, which may provide information associated with different processes being executed responsive to a set of testing inputs. An input 406A is provided by a client testing the interaction environment and, based on one or more features of the input, a reply 408A is generated. The reply 408A may include a variety of different types of responses to the input 406A, such as a confirmation, additional questions, greetings/pleasantries, and/or the like. Furthermore, the reply 408A may be provided initially when the user enters the chat/interaction and then additional replies, as noted herein, may build or otherwise develop based on the flow of the conversation and information provided by the client.

In this example, the client is testing out a bot for booking flights and provides, as the input 406A, a request to book a weekend trip to New York. While the illustrated embodiment includes a textual input (e.g. the user typed in a response and/or the user provided an auditory response that was converted to text), various embodiments may enable multi-modal inputs to the interaction environment as well. For example, the user may provide a textual instruction for how to process or use an image input, such as instructing the interaction environment to "turn this drawing into a bot" and uploading a schematic diagram. One or more associated systems of the interaction environment 402, such as a machine learning system for identifying and extracting keywords from the textual input provided as the input 406A and/or one or more image segmentation processes to parse and extract features from an image input, among various other options, may be deployed to attempt to identify an appropriate action and/or entity for executing the input 406A, determine whether different parameters can be populated using information from the input 406A, and/or to generate additional replies in order to obtain more information. Here, the Book Flights action 212B is deployed and the set of parameters 220 is illustrated to allow the tester to see which specific parameters are to be populated to enable execution of the book flights action 212B. Specific values 410 associated with particular parameters 220 are shown as being blank and/or unknown based on information from the input 406A. For example, the value 410A associated with the parameter 220A is unknown because "New York" could mean a city or somewhere within the state of New York. While various embodiments may enable the system to infer the client means New York City, systems and methods may also wish to provide higher accuracy by generating additional prompts to confirm or otherwise verify the proper city. The illustrated embodiment only shows the Book Flights action 216B for clarity, but systems and methods may also be used to track and monitor interactions with multiple actions 216 simultaneously during testing. For example, in this example, the input 406A indicates that the user was to "book a weekend trip" which may imply the desire to book both a flight and a hotel. Accordingly, various embodiments may be used to populate different parameters 220 associated with both the Book Flights action 212B and the Find Hotels action 212C (not pictured, but shown in FIG. 2D). As a result, the user may not be prompted to input the same information more than once, and instead, may provide a single answer that is used to fill in parameters 220 for each relevant action.

Additionally, as shown in the review panel 404, the values 410B, 410C associated with the parameters 220B, 220C are also unknown because the user has not provided a departure city or specific dates. Again, the system may be used to infer the departure city is a city associated with the user, such as information acquired from a user account, but it may be desirable to further enhance reliability and accuracy by obtaining specific information from the user first. Additionally, some cities may have multiple airports, and as a result, obtaining that preferential information may also enable the system to provide improved results. By way of example, a user in San Francisco may choose to fly out of San Francisco International or Oakland International, among various other nearby options. Also illustrated is the unknown date value because "a weekend trip" may not be sufficient to identify which weekend or when the trip should start and end. For example, the weekend may include Friday night flights or the user may wish to only travel on Saturday and Sunday. Accordingly, various systems and methods of the present disclosure may be used to identify these missing values to add and/or tune various additional entities or plugins to improve the interaction environment 402 prior to deployment.

A reply 408B is then generated to prompt the user for additional information to populate the various value 410A-410C. In this example, a single prompt asks for all of the information, but other embodiments may also include multiple different questions to populate the response. Additionally, in at least one embodiment, alternative options may also be presented, such as by presenting the user with a calendar to click and select dates, rather than asking for specific dates.

Figure 4A:
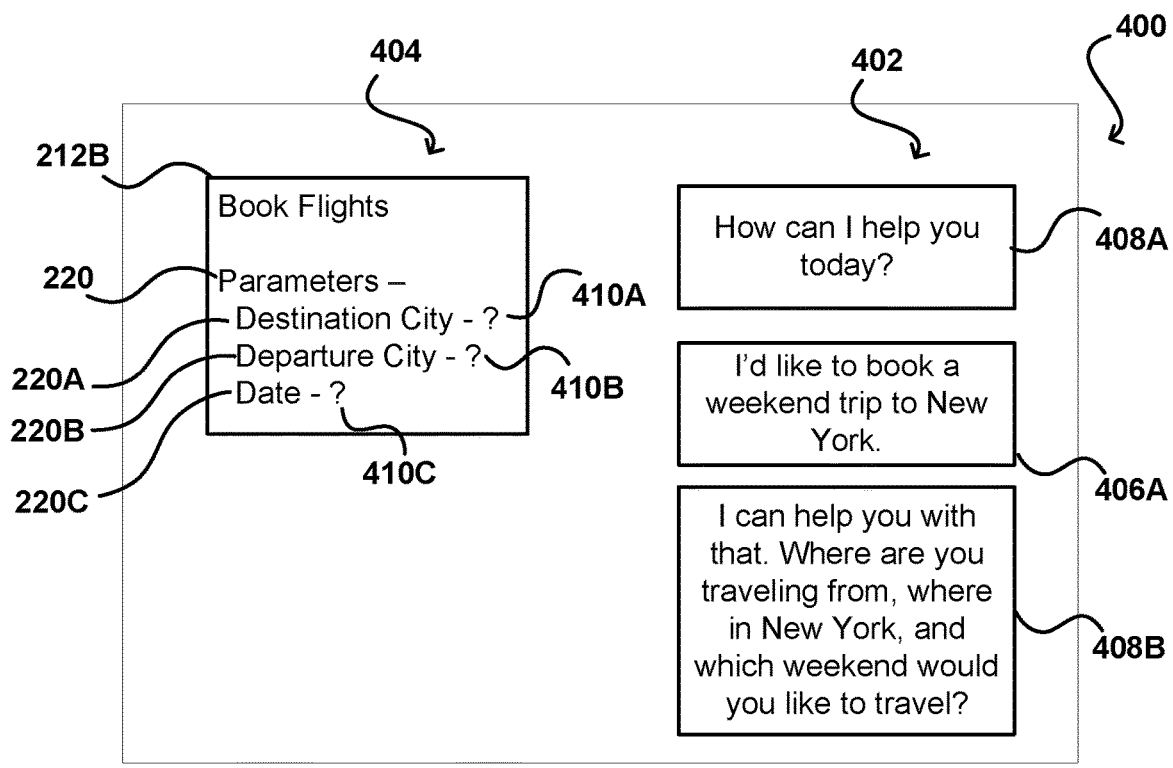
FIGS. 4A-4D illustrate example representations of a testing and validation environment that can be utilized in accordance with various embodiments.
Figure 4B:
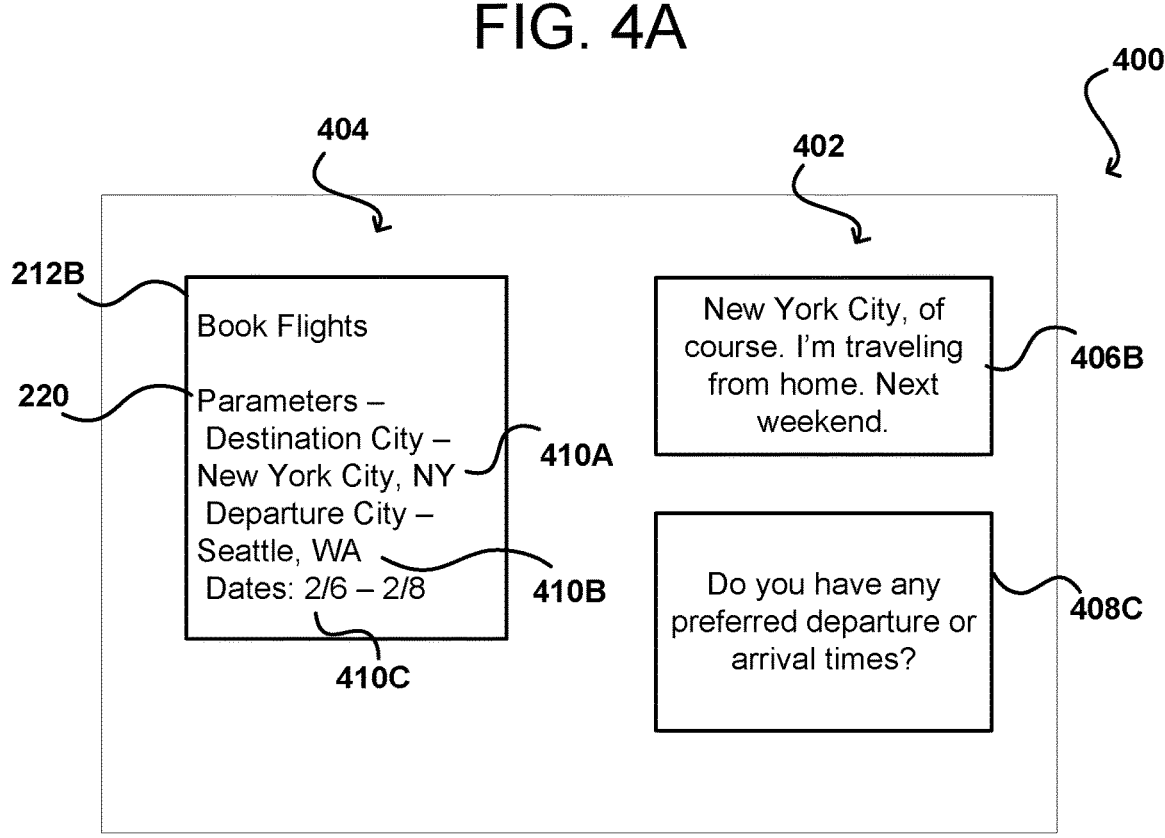

FIG. 4B illustrates the testing and validation environment 400 following the conversation from FIG. 4A in which the user has provided another input 406B responsive to the reply 408B. As noted herein, systems and methods may be used to extract information from the input 406B to populate the various values 410A-410C. For example, the user has provided the destination city as New York City. Additionally, the user has indicated they are traveling from home, which may be used to infer a departure city based on user information. Additionally, the user has provided information that can be used to infer dates as "next weekend" which could be used to assume a time in the future. In at least one embodiment, there may also be additional parameters associated with the book flights action 212B, which may generate further prompting of the user, as shown in the reply 408C. The system may then continue to prompt or generate questions for the user to get sufficient information to populate the various parameters and proceed with booking the flight for the user.

Figure 4C:
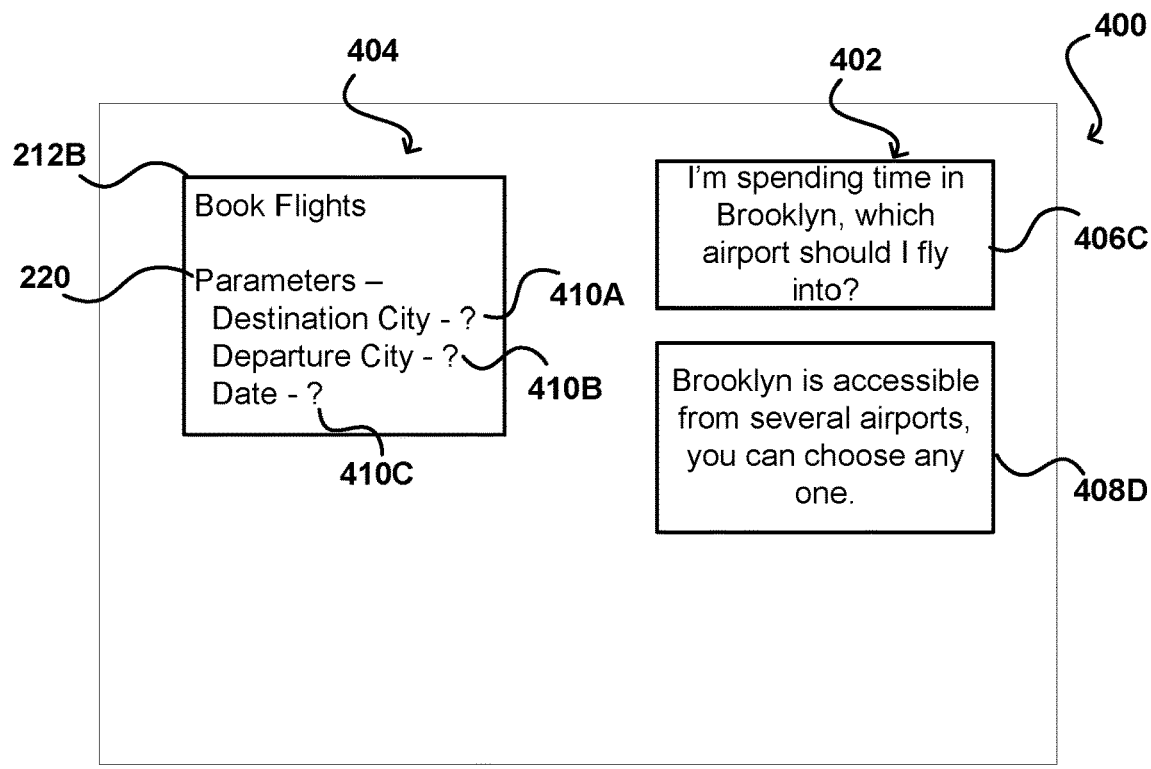
Figure 4D:
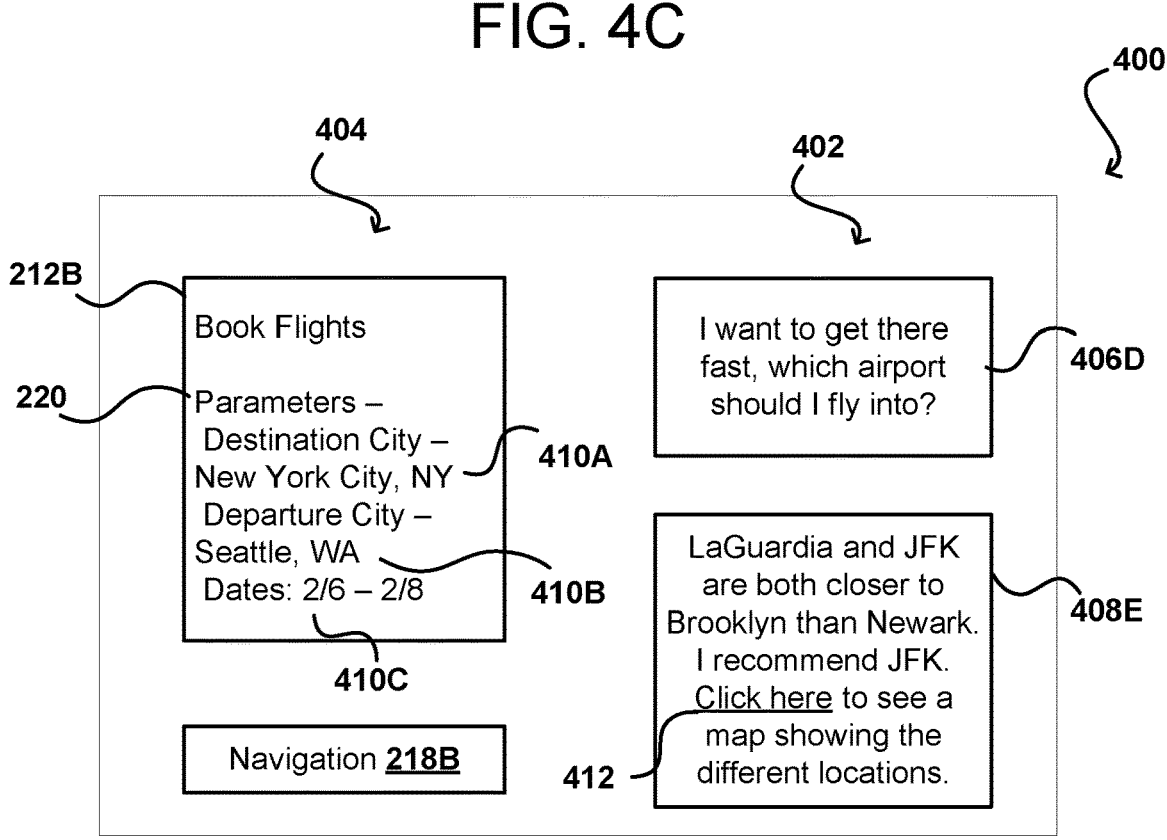

FIG. 4C illustrates the testing and validation environment 400 where the user has continued to provide prompts to get additional information for their trip. For example, the input 406C asks a question about travel arrangements with respect to a desired end location. Based on this information, the reply 408D is generated, but upon review in the validation environment, may not be considered helpful for the user. For example, informing the user they can make the selection does not provide a useful response, and moreover, does not help to fill in other parameters. FIG. 4D illustrates the testing and validation environment 400 where an additional plugin 218B has been added for navigation services. Now, when the input 406D is tested again, information may be extracted to fill in parameter values for the navigation plugin 218B and provide an improved reply 408E where a recommendation is provided to the user, which may also be used in searching for flights to ultimately address the initial input 406A. As noted herein, context is tracked through the conversation to identify that the "there" in the input 406D refers to Brooklyn from the input 406C. Additionally, a multi-modal reply is now provided to the user using the navigation plugin 218B because a link 412 is included for the user to click on to view a map showing different airport locations. In this manner, the interaction environment 402 may be tested and tuned prior to deployment to provide a desired user experience.

Figure 5:
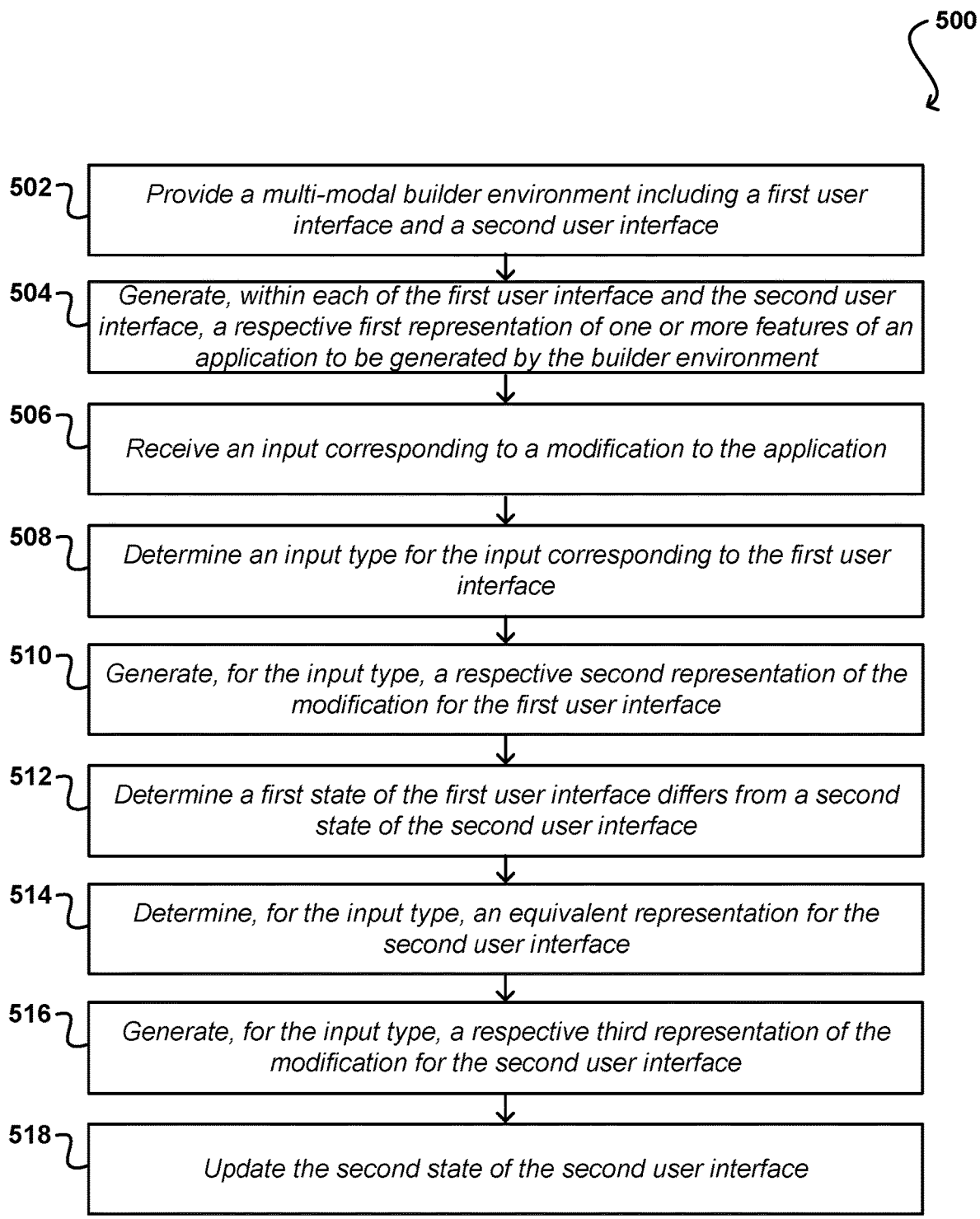
FIG. 5 illustrates an example process for tracking and updating state information between user interfaces in a builder environment that can be utilized in accordance with various embodiments.

FIG. 5 illustrates an example process 500 for implementing a multi-modal builder environment that can be used with embodiments of the present disclosure. It should be understood that there can be additional, fewer, or alternative steps performed in similar or alternative orders, or in parallel, within the scope of the various embodiments unless otherwise specifically stated. In this example a multi-modal builder environment is provided for developing one or more associated applications 502. In at least one embodiment, the builder environment allows a user to interact in a variety of different ways, which may include incorporating a number of different UIs, such as a first UI and a second UI. Respective representations of the application of generated for each UI 504. For example, a GUI may include blocks or icons illustrating different entities while a CUI may include textual descriptions of entities that are associated with the application. It should be appreciated that more UIs may be included in various embodiments.

In at least one embodiment, an input corresponding to a modification to the application is received 506. The input may be one of a number of different modalities and may, in various embodiments, be of a certain input type. For example, the input type may correspond to how the input was presented and/or which UI received the input. An input type may be determined 508 and, for that determined input type, a second representation of the application may be generated within the UI that received the input 510. For example, if the user were to click and drag an icon into the GUI, the GUI would include a representation showing that icon.

In at least one embodiment, state information is determined for the UI, such as the first UI that received the input. The state information may be compared to the other UI and it may be determined that state information differs between the various UIs 512. For example, upon adding the icon to the GUI, there may not be an equivalent representation in the CUI. Based on the input type, an equivalent representation may be determined for the second user interface 514 and then an updated representation of the second user interface may be generated 516. Returning to the click and drag example, the first user interface may include an icon and the second user interface may be evaluated and determined to include a textual representation describing the icon. In this manner, the second user interface may be updated to include the textual representation and the state information for the second user interface may be updated 518.

Figure 6:
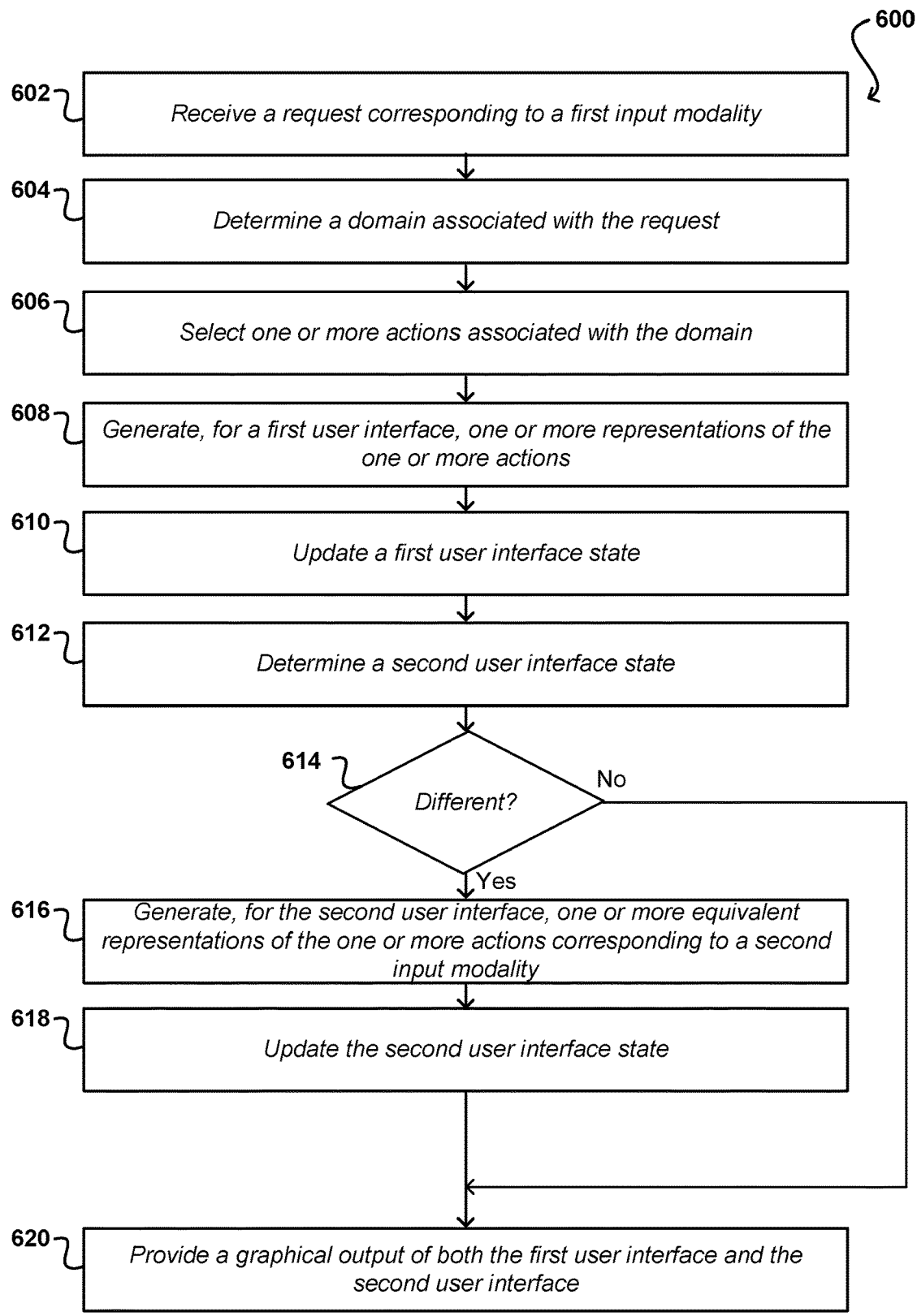
FIG. 6 illustrates an example process for tracking and updating state information between user interfaces in a builder environment that can be utilized in accordance with various embodiments.

FIG. 6 illustrates an example process 600 for implementing a multi-modal builder environment that can be used with embodiments of the present disclosure. In this example, a request is received corresponding to a first input modality 602. The first input modality may be particularized for a given UI associated with a builder environment. For example, a first UI may receive textual input while a second UI receives graphical inputs. A domain may be determined based on the request 604, where the domain provides or otherwise lists one or more options for incorporation within the builder environment. One or more actions associated with the domain may be selected 606 and one or more representations of the selected actions may be generated for a first user interface 608. In at least one embodiment, the first user interface corresponds to the interface that received the request in the first input modality. A first user interface state may then be updated 610 and compared to a determined second user interface state 612. It may be determined whether the states are different 614. If so, then one or more equivalent representations for the one or more actions, corresponding to a second input modality, may be generated for the second user interface 616. The second user interface state may then be updated 618 and a graphical output of both the first UI and the second UI may be provided 620.

Figure 7:
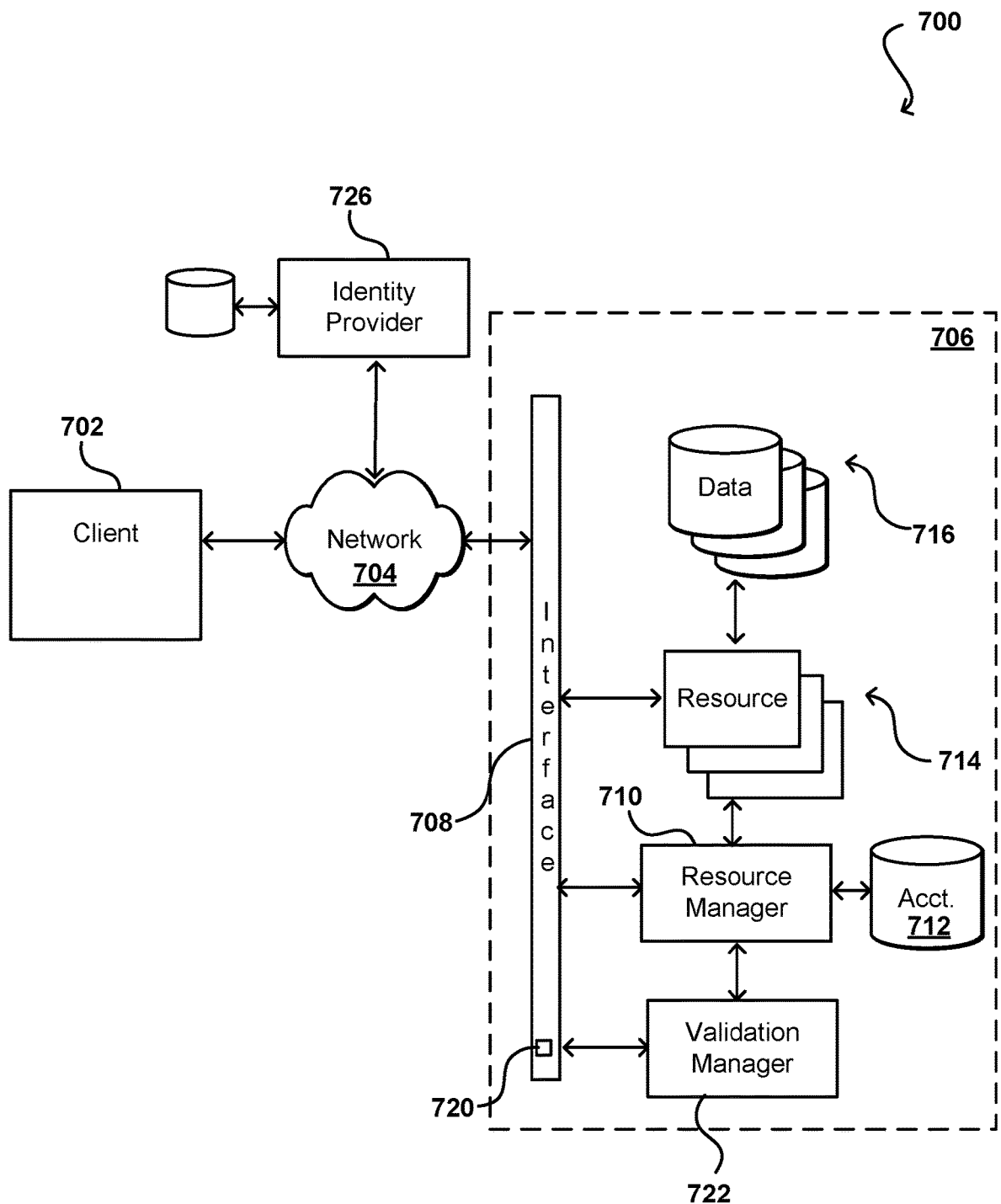
FIG. 7 illustrates an example environment in which aspects of various embodiments can be implemented.

FIG. 7 illustrates components of an example cloud computing environment 700 in which aspects of various embodiments can be implemented. In at least some embodiments, a client device 702 wanting to utilize a portion of the resources 714 can submit a request over a network 704 that is received to an interface layer 708 of the provider environment 706. The interface layer can include application programming interfaces (APIs) or other exposed interfaces enabling a user to submit requests to the provider environment. The interface layer 708 in this example can also include other components as well, such as at least one Web server, routing components, load balancers, and the like. When a request to provision a resource is received to the interface layer 708, information for the request can be directed to a resource manager 710 or other such system, service, or component configured to manage user accounts and information, resource provisioning and usage, and other such aspects. A resource manager 710 receiving the request can perform tasks such as to authenticate an identity of the user submitting the request, as well as to determine whether that user has an existing account with the resource provider, where the account data may be stored in at least one data store 712 in the provider environment. A user can provide any of various types of credentials in order to authenticate an identity of the user to the provider. These credentials can include, for example, a username and password pair, biometric data, a digital signature, or other such information. These credentials can be provided by, or obtained from, a number of different entities, such as an identity provider 726, a key management service, a corporate entity, a certificate authority, an identify broker, and the like. In some embodiments, a user can provide information useful in obtaining the credentials, such as user identity, account information, password, user-specific cryptographic key, customer number, and the like. The identity provider can provide the credentials to the resource provider environment 706 and/or to the client device 702, whereby the client device can utilize those credentials to obtain access or use of various resources in the provider environment, where the type and/or scope of access can depend upon factors such as a type of user, a type of user account, a role associated with the credentials, or a policy associated with the user and/or credentials, among other such factors.

The resource provider can validate this information against information stored for the user, for example using a validation manager 722. If the user has an account with the appropriate permissions, status, etc., the resource manager 710 can determine whether there are adequate resources 714 available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. Additionally, the user may be granted access to data 716 associated with the user account. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 702 to communicate with an allocated resource without having to communicate with the resource manager 710, at least until such time as a relevant aspect of the user account changes, the user is no longer granted access to the resource, or another such aspect changes.

The resource manager 710 (or another such system or service) in this example can also function as a virtual layer of hardware and software components that handles control functions in addition to management actions, as may include provisioning, scaling, replication, etc. The resource manager 710 can utilize dedicated APIs 720 in the interface layer 708, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 708 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service.

Figure 8:
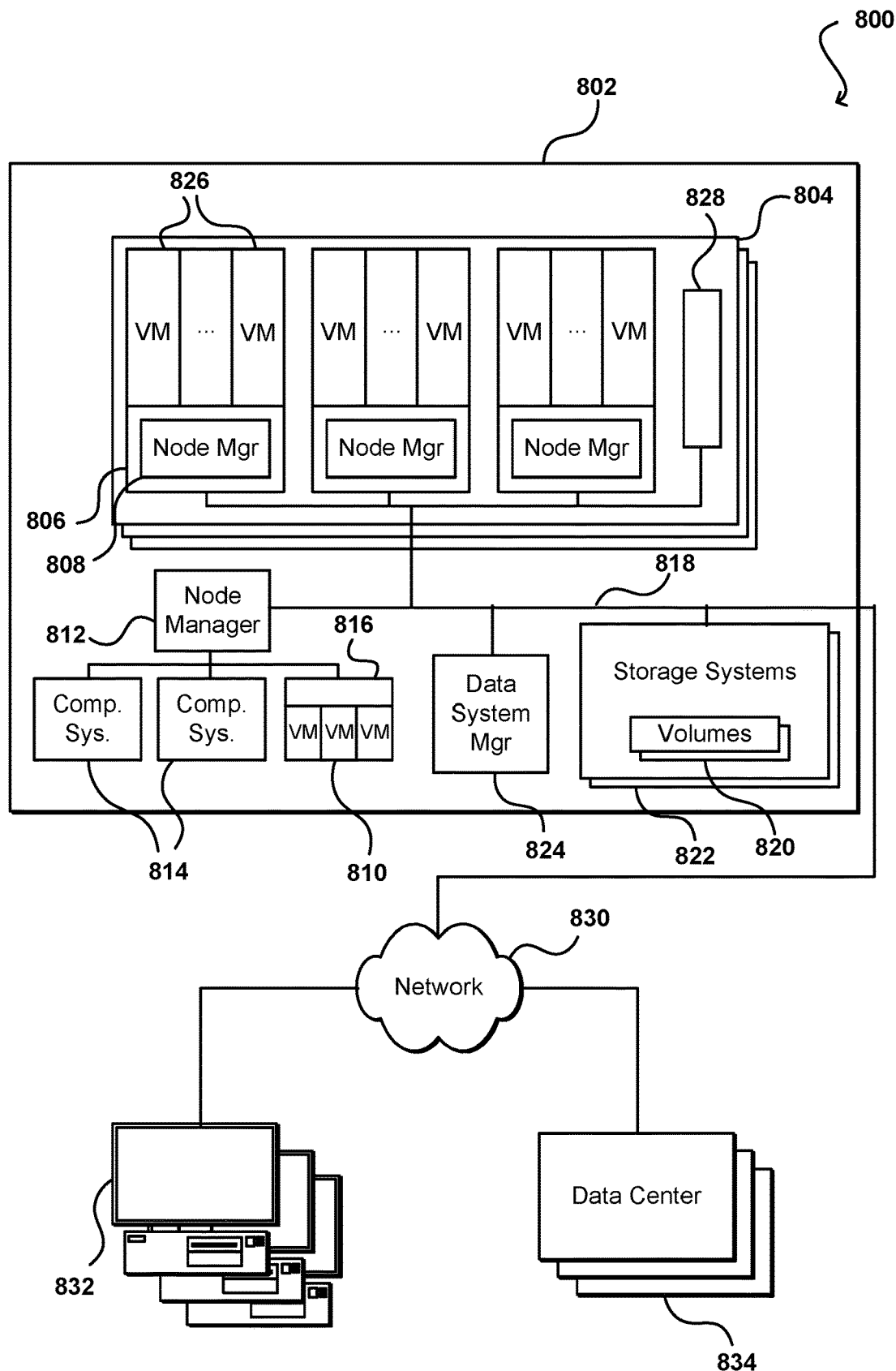
FIG. 8 illustrates components of an example data center that can be utilized in accordance with various embodiments.

FIG. 8 illustrates an example network configuration 800 in which such provisioning can be implemented in accordance with various embodiments. In this example configuration, multiple computing systems are operable to execute various programs, applications, and/or services, and further operable to access reliable block-based data storage, such as under the control of a block-based data storage service. In particular, in this example a block-based data storage service uses multiple block-based data storage systems in a data center to provide reliable, non-local, block-based data storage to executing programs or various other components, systems, or services. Multiple remote archival storage systems external to the data center may also be used to store additional copies of at least some portions of at least some block-based data storage volumes.

In this example, a data center 802 includes a number of racks 804, each rack including a number of host computing systems 806, as well as an optional rack support computing system 828 in this example embodiment. The host computing systems 806 on the illustrated rack 804 each host one or more virtual machines 826 in this example, as well as a distinct node manager module 812 associated with the virtual machines on that host computing system to manage those virtual machines. One or more other host computing systems 816 may also each host one or more virtual machines 810 in this example. Each virtual machine 810 may act as an independent resource node for executing one or more program copies or performing another such action or process for user data requests, I/O operations, etc. In addition, this example data center 802 further includes additional host computing systems 814 that do not include distinct virtual machines, but may nonetheless each act as a resource node for one or more tasks being executed for a user. In this example, a node manager module 812 executing on a computing system (not shown) distinct from the host computing systems 814 and 816 is associated with those host computing systems to manage the resource nodes provided by those host computing systems, such as in a manner similar to the node manager modules 808 for the host computing systems 806. The rack support computing system 828 may provide various utility services for other computing systems local to its rack 804 (e.g., long-term program storage, metering, and other monitoring of program execution and/or of non-local block data storage access performed by other computing systems local to the rack, etc.), as well as possibly to other computing systems located in the data center. Each computing system may also have one or more local attached storage devices (not shown), such as to store local copies of programs and/or data created by or otherwise used by the executing programs, as well as various other components.

This example the data center 802 also includes a computing system 824 that executes a data storage system manager module for the block-based data storage service to assist in managing the availability of non-local block-based data storage to programs executing on resource nodes provided by the host computing systems located within the data center (or optionally on computing systems located in one or more other data centers 834, or other remote computing systems 832 external to the data center). In particular, in this example the data center 802 includes a pool of multiple block-based data storage systems 822, which each have local block-based storage for use in storing one or more volume copies 820. Access to the volume copies 820 is provided over the internal network(s) 818 to programs executing on various resource nodes 810 and 814. As discussed in greater detail elsewhere, a block-based data storage system manager module 824 may provide a variety of services related to providing non-local block data storage functionality, including the management of user accounts (e.g., creation, deletion, billing, etc.); the creation, use and deletion of block data storage volumes and snapshot copies of those volumes; the collection and processing of performance and auditing data related to the use of block data storage volumes and snapshot copies of those volumes; the obtaining of payment from customers or other users for the use of block data storage volumes and snapshot copies of those volumes; etc. In some embodiments, the system manager module 824 may coordinate with the node manager modules 812, 808 to manage use of volumes by programs executing on associated resource nodes, while in other embodiments the node manager modules may not be used to manage such volume use. In addition, in other embodiments, one or more system manager modules 824 may be structured in other manners, such as to have multiple instances of the system manager executing in a single data center (e.g., to share the management of non-local block data storage by programs executing on the resource nodes provided by the host computing systems located within the data center), and/or such as to have at least some of the functionality of a system manager module being provided in a distributed manner by software executing on some or all of the server block data storage systems 822 (e.g., in a peer-to-peer manner, without any separate centralized system manager module on a computing system 824).

In this example, the various host computing systems, server block data storage systems, and computing systems are interconnected via one or more internal networks 818 of the data center, which may include various networking devices (e.g., routers, switches, gateways, etc.) that are not shown. In addition, the internal networks 818 are connected to an external network 830 (e.g., the Internet or another public data network) in this example, and the data center 802 may further include one or more optional devices (not shown) at the interconnect between the data center and an external network (e.g., network proxies, load balancers, network address translation devices, etc.). In this example, the data center 802 is connected via the external network 830 to one or more other data centers 834 that each may include some or all of the computing systems and storage systems illustrated with respect to data center 802, as well as other remote computing systems 832 external to the data center. The other computing systems 832 may be operated by various parties for various purposes, such as by the operator of the data center or third parties (e.g., customers of the program execution service and/or of the block data storage service). In addition, one or more of the other computing systems may be archival storage systems (e.g., as part of a remote network-accessible storage service) with which the block data storage service may interact, such as under control of one or more archival manager modules (not shown) that execute on the one or more other computing systems or instead on one or more computing systems of the data center, as described in greater detail elsewhere. Furthermore, while not illustrated here, in at least some embodiments, at least some of the server data storage systems may further be interconnected with one or more other networks or other connection mediums, such as a high-bandwidth connection over which the storage systems may share volume data (e.g., for purposes of replicating copies of volumes and/or maintaining consistency between primary and mirror copies of volumes), with such a high-bandwidth connection not being available to the various host computing systems in at least some such embodiments.

It will be appreciated that the example of FIG. 8 has been simplified for the purposes of explanation, and that the number and organization of host computing systems, server block data storage systems and other devices may be much larger than what is depicted in FIG. 8. For example, as one illustrative embodiment, there may be thousands of computing systems per data center, with at least some of those computing systems being host computing systems that may each host fifteen virtual machines or more, and/or with some of those computing systems being block-based data storage systems that may each store several volume copies. If each hosted virtual machine executes one program, a data center may execute tens of thousands of program copies at one time. Furthermore, hundreds or thousands (or more) of volumes may be stored on the server block data storage systems, depending on the number of server storage systems, size of the volumes, and number of mirror copies per volume. It will be appreciated that in other embodiments, other numbers of computing systems, programs and volumes may be used.

An environment such as that illustrated with respect to FIG. 8 can be used to provide and manage resources shared among various customers. In one embodiment, a virtualized storage system can be provided using a number of data servers, each having a number of storage devices (e.g., storage disks) attached thereto. The storage system can expose the storage to the customers as a Web service, for example. Customers then can submit Web services requests, or other appropriate requests or calls, to allocate storage on those servers and/or access that storage from the instances provisioned for those customers. In certain embodiments, a user is able to access the data volumes of these storage devices as if those storage devices are conventional block devices. Since the data volumes will appear to the customer instances as if each volume is a disk drive or similar block device, the volumes can be addressed with offsets, lengths, and other such conventional block device aspects. Further, such a system can provide what will be referred to herein as "read after write" consistency, wherein data is guaranteed to be able to be read from the data as soon as the data is written to one of these data volumes. Such a system can provide relatively low latency, such as latencies less than about ten milliseconds. Such a system thus in many ways functions as a traditional storage area network (SAN), but with improved performance and scalability.

Using a management system as illustrated in FIG. 8, for example, a customer can make a Web service call into an appropriate API of a Web service layer of the system to provision a data volume and attach that volume to a data instance for that customer. The management system can be thought of as residing in a control plane, or control environment, with the data volumes and block storage devices residing in a separate data plane, or data environment. The traffic and operations of the cloud provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the cloud provider network (e.g., computing instances, containers, block storage volumes, databases, file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

In one example, a customer with at least one provisioned instance can call a "CreateVolume" or similar API, via Web services, which enables the customer to specify the amount of storage to be allocated, such as a value between 1 GB and 1 TB, in 1 GB increments. Components of the control plane, such as a system manager module, can call into the data plane to allocate the desired amount of storage from the available resources, and can provide the customer with an identifier for the data volume. In some embodiments, the customer then can call an "Attach Volume" or similar API, wherein the customer provides values for parameters such as an instance identifier, a volume identifier, and a device name, depending on factors such as the operating system of the instance, using a scheme that the operating system provides for hard drives and similar storage devices, as from inside the instance there is no apparent difference, from at least a functionality and naming point of view, from a physical hard drive. Once the customer has attached the data volume to a provisioned instance, the customer can cause various functionality to be performed, such as to build a file system, use as raw storage for a data system, or any other such activity that would normally be performed with a conventional storage device. When the customer no longer requires the data volume, or for any other appropriate reason, the customer can call a "Detatch Volume" or similar API, which can cause the association of the instance to that volume to be removed. In some embodiments, the customer can then attach a new instance or perform any of a number of other such activities. Since the data volume will fail independently of the instances in some embodiments, the customer can attach a volume to a new instance if a currently associated instance fails.

Figure 9:
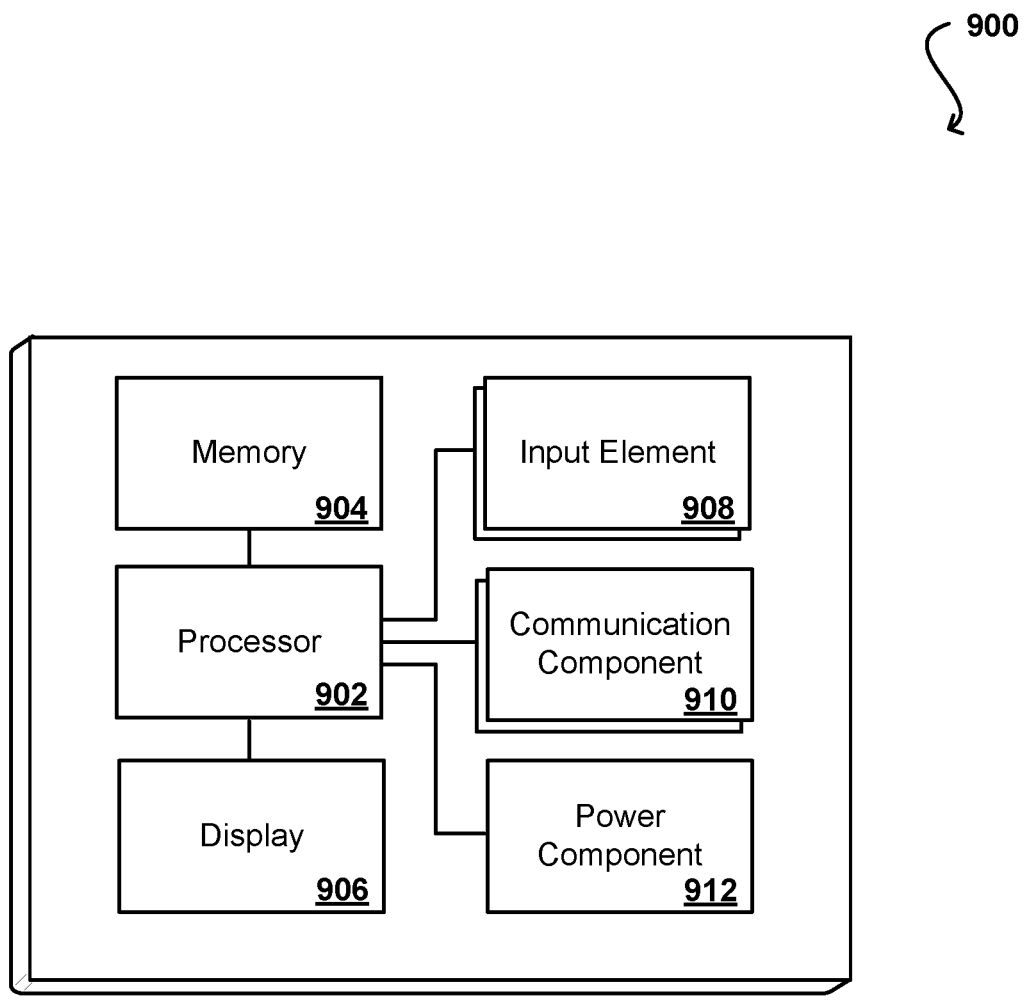
FIG. 9 illustrates components of an example computing device that can be used to perform aspects of the various embodiments.

FIG. 9 illustrates a logical arrangement of a set of general components of an example computing device 900. In this example, the device includes a processor 902 for executing instructions that can be stored in a memory device or element 904. As would be apparent to one of ordinary skill in the art, the device can include many types of memory, data storage, or non-transitory computer-readable storage media, such as a first data storage for program instructions for execution by the processor 902, a separate storage for images or data, a removable memory for sharing information with other devices, etc. The device typically will include some type of display element 906, such as a touch screen or liquid crystal display (LCD), although devices such as portable media players might convey information via other means, such as through audio speakers. As discussed, the device in many embodiments will include at least one input element 908 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 900 of FIG. 9 can include one or more network interface or communication elements or components 910 for communicating over various networks, such as a Wi-Fi, Bluetooth, RF, wired, or wireless communication systems. The device in many embodiments can communicate with a network, such as the Internet, and may be able to communicate with other such devices. The device will also include one or more power components 912, such as power cords, power ports, batteries, wirelessly powered or rechargeable receivers, and the like.

Example environments discussed herein for implementing aspects in accordance with various embodiments are primarily Web-based, as relate to Web services and cloud computing environments, but it should be appreciated that, although a Web-based environment is used for purposes of explanation, different environments may be used, as appropriate, to implement various embodiments. Client devices used to interact with various embodiments can include any appropriate device operable to send and receive requests, messages, or information over an appropriate network and convey information back to a user of the device. Examples of such client devices include personal computers, smart phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof.

It should be understood that there can be several application servers, layers, or other elements, processes, or components, which may be chained or otherwise configured, which can interact to perform tasks as discussed and suggested herein. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between a client device and a resource, can be handled by the Web server. It should be understood that the Web and application servers are not required and are merely example components, as structured code discussed herein can be executed on any appropriate device or host machine as discussed elsewhere herein.

A data store can include several separate data tables, databases, or other data storage mechanisms and media for storing data relating to a particular aspect. The data store is operable, through logic associated therewith, to receive instructions from a server, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server, and typically will include a non-transitory computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are described. Thus, the depictions of various systems and services herein should be taken as being illustrative in nature, and not limiting to the scope of the disclosure.

Various aspects can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   providing a multi-modal builder environment including a first user interface associated with a first input modality and a second user interface associated with a second input modality;
   receiving an input corresponding to a modification to one or more features of an application represented within both the first user interface and the second user interface;
   determining an input type for the input corresponds to the first user interface;
   generating, for the first user interface, a first user interface representation of the modification;
   determining, based on the modification, a first user interface application state corresponding to the one or more features of the application after applying the modification according to the input;
   determining a second user interface application state is different from the first user interface application state;
   generating, for the second user interface, a second user interface representation of the modification; and
   providing respective representations of the application, including the modification, on the first user interface and the second user interface corresponding to the first user interface application state and the second user interface application state.

2. The computer-implemented method of claim 1, further comprising:
   receiving a second input corresponding to a second modification; and
   determining, based on a context of the second input, that the second modification corresponds to the one or more features of the application associated with the input.

3. The computer-implemented method of claim 1, further comprising:
   determining an domain associated with the input; and
   providing one or more recommendations for the modification.

4. The computer-implemented method of claim 1, further comprising:
   providing a testing and validation environment for the application;
   receiving a testing prompt for the application; and
   causing the application to generate a response to the testing prompt.

5. The computer-implemented method of claim 1, wherein the first user interface is a graphical user interface and the second user interface is a conversational user interface.

6. A computer-implemented method, comprising:
   receiving a first input of a first modality to modify an entity associated with an application in a builder environment, the builder environment including a first user interface (UI) associated with the first modality and a second UI associated with a second modality;

generating, based on the first input, a first UI application representation corresponding to one or more modifications to the entity, the first UI application representation being presented in a first UI presentation modality;

generating, based on the first input and the first UI application representation, a second UI application representation corresponding to the one or more modifications to the entity, the second UI application representation being presented in a second UI presentation modality; and providing, within the builder environment, the first UI application representation within the first UI and the second UI application representation within the second UI.

7. The computer-implemented method of claim 6, wherein the first input is provided to the first UI based on a modification category including at least one of a global change, a recommendation request, and an atomic change.

8. The computer-implemented method of claim 6, further comprising:
determining a first representation type corresponding to the first modality;
determining a second representation type corresponding to the second modality; and
determining an equivalent representation of the first input for each of the first representation type and the second representation type.

9. The computer-implemented method of claim 6, wherein the first UI is a graphical UI and the second UI is a conversational UI.

10. The computer-implemented method of claim 6, wherein the first input is a natural language input, further comprising:
extracting, from the first input, one or more keywords corresponding to the one or more modifications; and
determining, based on the one or more keywords, one or more actions to modify the entity.

11. The computer-implemented method of claim 6, further comprising:
determining a connection between one or more parameters of the entity, the first input, and one or more additional entities; and
modifying, based on the first input and the connection, the one or more parameters of the entity and the one or more additional entities.

12. The computer-implemented method of claim 6, wherein the first input is a textual input, an interaction with one or more icons, an auditory input, a video input, an image input, a data file input, or a combination thereof.

13. The computer-implemented method of claim 6, further comprising:
determining a domain associated with the first input;
retrieving one or more associated actions for the domain; and
providing, as a recommendation responsive to the first input, the one or more associated actions to modify the entity.

14. The computer-implemented method of claim 6, further comprising:
receiving a second input of the second modality to modify to the second UI;

identifying, based on the second input and the first input, a context for the second input corresponds to the entity; and
determining an action to modify the entity responsive to the second input.

15. A system, comprising:
at least one processor; and
memory including instructions that, when executed by the at least one processor, cause the system to:
receive a first input of a first modality to modify an entity associated with an application in a builder environment, the builder environment including a first user interface (UI) associated with the first modality and a second UI associated with a second modality;
generate, based on the first input, a first UI application representation corresponding to one or more modifications to the entity, the first UI application representation being presented in a first UI presentation modality;
generate, based on the first input and the first UI application representation, a second UI application representation corresponding to the one or more modifications to the entity, the second UI application representation being presented in a second UI presentation modality; and
provide, within the builder environment, the first UI application representation within the first UI and the second UI application representation within the second UI.

16. The system of claim 15, wherein the first input is provided to the first UI based on a modification category including at least one of a global change, a recommendation request, and an atomic change.

17. The system of claim 15, wherein the instructions when executed further cause the system to:
determine a first representation type corresponding to the first modality;
determine a second representation type corresponding to the second modality; and
determine an equivalent representation of the first input for each of the first representation type and the second representation type.

18. The system of claim 17, wherein the first UI is a graphical UI and the second UI is a conversational UI.

19. The system of claim 17, wherein the first input is a natural language input and the instructions when executed further cause the system to:
extract, from the first input, one or more keywords corresponding to the one or more modifications; and
determine, based on the one or more keywords, one or more actions to modify the entity.

20. The system of claim 15, wherein the instructions when executed further cause the system to:
determine a connection between one or more parameters of the entity, the first input, and one or more additional entities; and
modify, based on the first input and the connection, the one or more parameters of the entity and the one or more additional entities.

* * * * *